United States Patent [19]

Mizutani et al.

[11] Patent Number: 5,218,444
[45] Date of Patent: Jun. 8, 1993

[54] ZOOM AND AUTO FOCUS CONTROLS FOR VIDEO CAMERA

[75] Inventors: Masao Mizutani, Kanagawa; Satoko Senuma, Tokyo, both of Japan

[73] Assignee: Sony Corporation, Japan

[21] Appl. No.: 683,559

[22] Filed: Apr. 10, 1991

[30] Foreign Application Priority Data

Apr. 18, 1990 [JP] Japan .................................. 2-100388
Apr. 18, 1990 [JP] Japan .................................. 2-100389
Apr. 18, 1990 [JP] Japan .................................. 2-100390
Apr. 18, 1990 [JP] Japan .................................. 2-100391

[51] Int. Cl.$^5$ ...................... H04N 5/232; H04N 5/225
[52] U.S. Cl. ..................................... 358/227; 354/404
[58] Field of Search ....................... 358/227, 225, 209; 354/400, 404

[56] References Cited

U.S. PATENT DOCUMENTS

| | | | |
|---|---|---|---|
| 4,611,244 | 9/1986 | Hanma et al. | 358/227 |
| 4,853,788 | 8/1989 | Murashima et al. | 358/227 |
| 4,899,190 | 2/1990 | Hata | 354/400 |
| 4,920,420 | 4/1990 | Sano et al. | 358/227 |
| 4,969,044 | 11/1990 | Hijikata et al. | 358/227 |
| 4,991,944 | 2/1991 | Hirao et al. | 350/429 |
| 5,061,954 | 10/1991 | Toyama et al. | 354/402 |

FOREIGN PATENT DOCUMENTS 2635200 6/1989 France .
63-029717 2/1988 Japan .................................. 358/227
63-032510 2/1988 Japan .................................. 358/227

OTHER PUBLICATIONS

European Search Report, Patent Abstracts of Japan, vol. 12, No. 413, Nov. 2, 1988.

Primary Examiner—James J. Groody
Assistant Examiner—Safet Metjahic
Attorney, Agent, or Firm—Ronald P. Kananen

[57] ABSTRACT

A video camera which is able to reverse the direction of the moving focus lens if appropriate evaluation data is not obtained within a certain period of time after an intermediate point is detected during the focus lens movement in one direction. This eliminates the redundant operation of the focus lens moving away from the just-focus point all the way to the extreme of the current direction before heading back to the just-focus point during an auto focus operation. An efficient auto focus operation is thus achieved. In addition, control is provided for not using a decrease in accumulated data as auto focus control information if that decrease is judged to be an abrupt drop from the accumulated data obtained in the immediately preceding focus lens position. This makes it possible to prevent the focus lens from being erroneously focused in cases of panning and other focus-disrupting operations. In this manner, the photographing of high quality is always made available.

15 Claims, 16 Drawing Sheets

ZOOM AND AUTO FOCUS CONTROLS FOR VIDEO CAMERA

BACKGROUND OF THE INVENTION

1. Field of the Invention;

The present invention relates to a video camera that provides an auto focus function not only in a normal region ranging from telephoto to wide angle settings, but also in a macro region.

2. Description of the Prior Art;

Prior art video cameras having an auto focus function automatically drive the focus lens in what is known as a normal region between two extreme settings, i.e., between telephoto and wide-angle settings.

One known focus lens drive control method (as disclosed in Japanese Patent Application No. 62-146628) is based illustratively on the principle that the frequency components of the video signal, with the exception of the DC component thereof, are maximized at a point where the lens is in focus. Under this method, the frequency components of the video signal excluding the DC component thereof are accumulated, and the result is used as evaluation data. In operation, the lens is positioned so that the evaluation data is maximized. This is the so-called mountain climbing control. The focus ring for the lens is driven by a motor arrangement controlled in speed by varying the supplied DC voltage.

Assume that the focus lens, i.e., its focus ring, is controlled in movement relative to an object within a region between a near position N (wide angle) and a far position $\infty$ (telephoto) so that the curve of evaluation data Dt is obtained as shown in FIG. 9. In that case, if the focus lens is at a point $P_1$ at the start of an auto focus operation, the focus lens is moved in a given direction so as to verify the direction in which the evaluation data Dt is maximized. As the focus lens is driven in that data maximizing direction, the evaluation data Dt is consecutively acquired. Near the peak of the evaluation data curve, the focus lens is fine-tuned in movement toward either the N or the $\infty$ setting. Ultimately, the focus lens is positioned at a point $P_j$ where the maximum evaluation data Dt is obtained.

The direction in which the auto focus operation starts, i.e., the direction in which the direction determining operation starts, is illustratively set based on the focus position derived from the immediately preceding auto focus operation. That is, the initial direction of focus lens movement is not predetermined to be either in the N or in the $\infty$ direction.

One disadvantage of the above-described auto focus control method is as follows: Assume that when the evaluation data Dt with its curve depicted in FIG. 10 is obtained regarding a given object, the focus lens is positioned at point $P_1$ and that the focus lens is driven in the $\infty$ direction for direction determination at the start of an auto focus operation. In such a case, the appropriate evaluation data cannot be acquired during the direction determining operation. That is, when the lens is driven from a point $P_1$ to a point $P_2$ (i.e., a maximum telephoto position), the evaluation data Dt remains fairly constant at a very low level or is hardly obtained. This makes it impossible from point $P_1$ to determine in which direction (toward $\infty$ or N) the peak of the evaluation data Dt is located. Thus the focus lens is driven up to the extreme point $P_2$, where the lens changes its direction and starts moving in the N direction. It is only after the lens passes the point $P_1$ that the appropriate evaluation data Dt is acquired. Thereafter, point $P_j$ is reached under mountain climbing control. That is, there occurs quite a redundant operation between points $P_1$ and $P_2$.

This is especially the case when the just-focus position is near either of the two extreme lens positions. If the focus lens starts being driven in the opposite direction of the just-focus position at the start of an auto focus operation, the focusing is inefficient and takes time. Furthermore, the sight of the focus lens moving in a redundant manner looks a little unseemly.

Some other disadvantages of the prior art will be mentioned below. The curve of the accumulated data shown in FIG. 9 necessarily varies in peak position and shape depending on the distance to the object and on the nature thereof. Thus, in an auto focus operation, the distance to the object always varies and the peak of the accumulated data curve varies accordingly. The varying peak position leads to focusing error.

Assume that when the object whose accumulated data curve is shown in FIG. 9 is being photographed, a second object such as a person or a car moves across between the object and the video camera. The evaluation data is accumulated with respect to the second object at the very moment the latter hides the original object when passing in front of the video camera. At that moment, the lens is automatically moved for focusing from point $P_1$ to point $P_2$. At point $P_2$, the accumulated data drops abruptly as illustrated in FIG. 11. A drop in accumulated data under mountain climbing control causes the auto focus controller of the video camera to conclude that the lens position has gone past the peak of the accumulated data. Reversing the direction of lens movement, the auto focus controller erroneously judges that point $P_x$ immediately preceding the drop in the accumulated data is the just-focus position.

This is also the case where, during an auto focus operation with respect to a nearby object, the video camera is abruptly panned to take pictures of far-off sceneries. Assume that the video camera is panned while an auto focus operation is being carried out under mountain climbing control from point $P_1$ to point $P_{j(1)}$ (i.e., a just-focus point) in accordance with the accumulated data curve shown by a solid line in FIG. 12. In that case, the broken line curve of the accumulated data is obtained starting from point $P_2$, where the video camera was panned, in the $\infty$ direction. The accumulated data drops suddenly at the point $P_2$, and the auto focus controller of the video camera erroneously concludes that the point $P_x$ is the peak of the curve. The same error also occurs when the video camera is abruptly panned from a far-off object to a nearby object.

The trouble above is summed up as follows: When a sudden change occurs to the current object during an auto focus operation under mountain climbing control, an erroneous judgment of the situation by the auto focus system makes it impossible to move the focus lens to the appropriate focal point. Thus, the photographing of high quality is not available.

To effect auto focus control requires detecting the focus lens position. If the focus lens is to be controlled in conjunction with a zoom lens, it is also necessary to detect the zoom lens position.

One prior art detection method for the focus lens position involves attaching a reflective film arrangement to a lens-mounted cylinder and providing a detecting means comprising light-emitting and light-receiving diodes, the reflective film arrangement giving reflected light whereby the lens position is detected. A method for effectively detecting the maximum positions of the lens is proposed by Japanese Patent Application No. 63-51293. The zoom lens is conventionally positioned in a simple manner illustratively involving the use of a resistor switch arrangement.

Auto focus control may be desired not only over the normal region but also over the macro region, i.e., ranging from the widest-angle position to the shortest-distance position of the normal region. This requires driving the zoom lens under the same mountain climbing control as for the focus lens. In that case, it is necessary to detect zoom lens positions with precision. For example, as depicted in FIG. 16, it is indispensable to detect various positions of the zoom lens, such as in telephoto T, middle telephoto MT, middle wide MW, or wide W intervals in the normal region, as well as the macro region area which includes at least two macro edge positions MCa and MCb of the zoom lens at the edges of the macro region and ma macro region MC in between them. A disadvantage is experienced with the prior art where seven zoom lens positions from telephoto T to macro region edge position MCb are to be detected, the disadvantage being the need to provide a large number of switching means for on/off control over the zoom lens positions within the respective regions. The numerous switching means tend to constitute a large-scale detecting mechanism that is difficult to incorporate in a compact video camera.

Furthermore, to drive the zoom lens requires relatively high levels of torque. Because the driving torque varies significantly from one driving unit to another, simply raising or lowering the DC voltage supply to the zoom ring motor is not sufficient to fine-tune the zoom lens movement while the lens movement speed is being adjusted. Where it is desired to move the zoom lens for a very short distance by lowering the DC voltage, one of two things may occur: the coefficient of mechanical static friction in the lens moving mechanism may be high enough to prevent the lens from moving at all, or the lens may move suddenly—and unpredictably—when the rising voltage reaches a certain critical level.

The above impediment makes it impossible to improve the means of the video camera for searching for the just-focus point in a narrow area in a fine-tuning manner during an auto focus operation within the macro region.

SUMMARY OF THE INVENTION

It is therefore an object of the present invention to provide a video camera wherein position detection signals are the same for an automatically focused zoom lens at both edges of the macro region, the zoom lens being driven upon power-up in the telephoto direction in order to detect at which edge of the macro region the zoom lens is currently located, the position detection signal being acquired when the zoom lens leaves the macro edge area. This aspect of the invention ensures verification of the lens position to prevent system error.

It is another object of the present invention to provide a video camera wherein, with the zoom lens leaving the normal region and entering the macro region at the start of an auto focus operation in the macro region, a first macro region edge detection signal alone is disconnected so as to prevent system error.

It is a further object of the present invention to provide a video camera having a controller which intermittently supplies driving signals to a zoom lens driving circuit at least near the just-focus point of an automatically focused zoom lens during a macro auto focus operation in the macro region for the purpose of fine-tuned searching for the just-focus point of the lens.

It is an even further object of the present invention to provide a video camera wherein, with the focus lens or zoom lens driven in one direction and reaching a middle point of the lens position available area during an auto focus operation, unavailability thereafter of appropriate focus control information for a predetermined period of time causes the controller of the camera to conclude that the just-focus point is not found in that direction and to change the lens in its moving direction accordingly. Under this control scheme, where the just-focus point is not found in the current lens moving direction, the lens is not moved all the way to the edge of the region. This improves the efficiency of the auto focus operation.

It is another object of the present invention to provide a video camera wherein specific frequency components of the video signal are successively accumulated as focus control information while the focus lens is being moved for auto focusing, the control information being referenced to drive the focus lens in the direction in which the accumulated data (i.e., the control information) becomes maximized. This aspect of the invention is intended to prevent an abrupt drop in the successively accumulated data of the specific frequency components in the video signal from being used as part of the auto focus control information. Such sudden drops in the accumulated data occur when, illustratively, a person walks across between the video camera and its object during an auto focus operation.

DESCRIPTION OF THE PREFERRED EMBODIMENT

Figure 1:
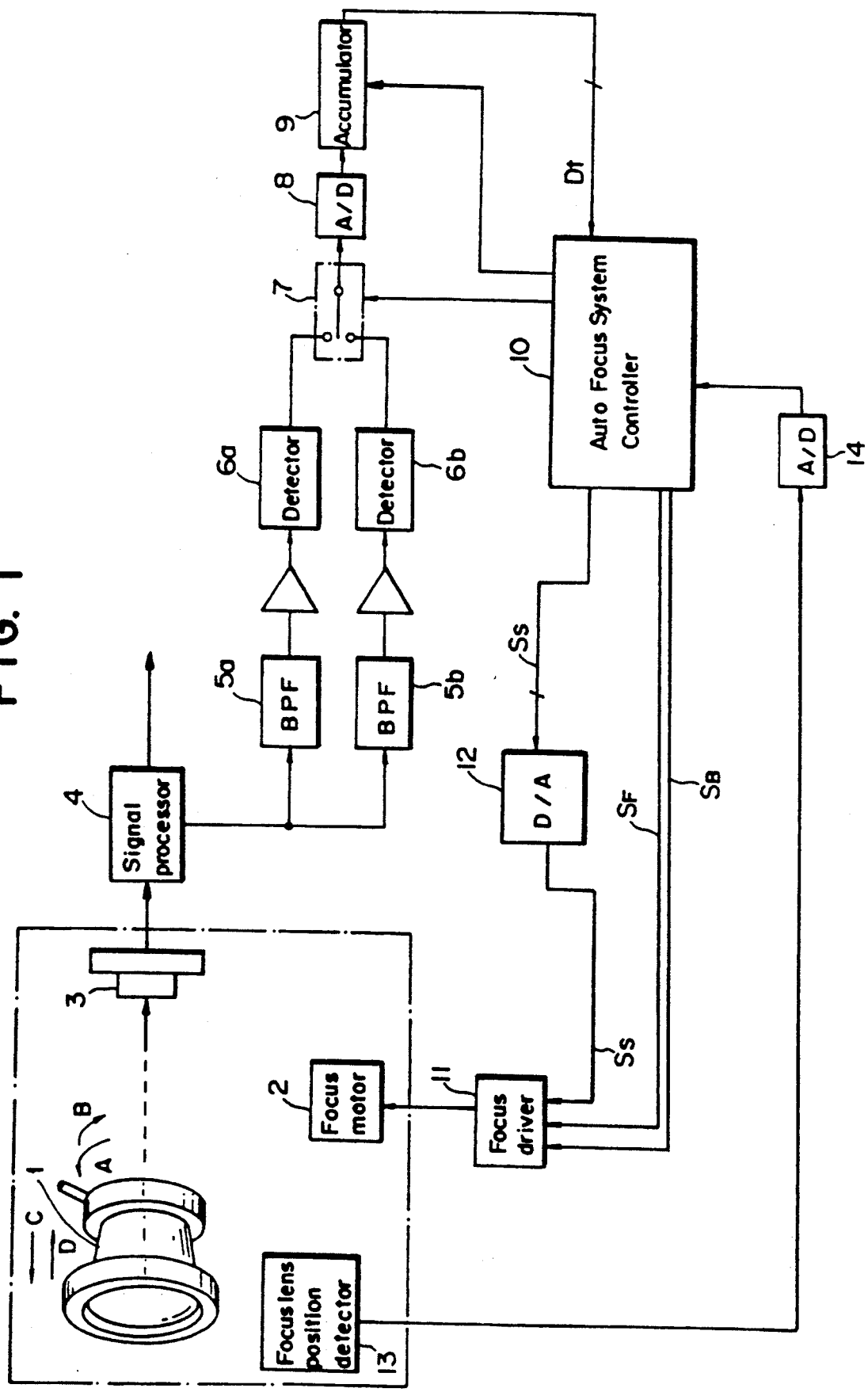
FIG. 1 is a block diagram showing an embodiment of an auto focus control circuit in the video camera according to the invention.

FIG. 1 is a block diagram depicting one embodiment of the auto focus control circuit in the video camera according to the invention. In FIG. 1, reference numeral 1 is a lens system wherein a focus lens is rotated by a driving motor 2 in arrowed directions A and B and is thereby moved in arrowed directions C and D for focus position control. This lens system is automatically focused under what is known as the mountain climbing control, which is based on a contrast detecting method (frequency separating method) to be described later. In this embodiment, the focus lens is in focus at longer distances when driven in direction A (i.e., moved in direction C), and comes into focus at shorter distances when driven in direction B (i.e., moved in direction D).

Reference numeral 3 is a (CCD) charge coupled device image pickup tube that photographs an object via the lens system 1. The CCD image pickup tube outputs the image signal to a signal processor 4.

The signal processor 4, comprising a process circuit and a color encoder, generates a luminance signal and a chrominance signal based on the output signal from the CCD image pickup tube 3.

Band pass filters 5a and 5b are supplied with the luminance signal from the signal processor 4. The band pass filters 5a and 5b illustratively have center frequencies of 100 kHz and 500 kHz, respectively. These filters extract predetermined frequency components from the luminance signal supplied by the signal processor 4. The extracted frequency components are supplied via amplifiers to detectors 6a and 6b where the levels of the frequency components are detected.

A switching circuit 7 determines, under control of an auto focus system controller (simply called the controller) 10, which of the two outputs of the detected frequency components is to be used, namely which of the frequency components extracted by the band pass filters 5a and 5b. For example, if the object of the camera is in high contrast against its background, the output from the band pass filter 5a is selected; if the object is in low contrast against its background, the output from the band pass filter 5b is selected.

The output selected by the switching circuit 7, i.e., the signal representing the level of a predetermined signal component from within the luminance signal, is converted to a digital format by an A/D converter 8. The digital output from the A/D converter 8 is supplied to an accumulator 9. The accumulator 9 is supplied with an accumulation area control signal from the controller 10. The level data of the predetermined frequency component, supplied from the A/D converter 8 after extraction from the luminance signal, is accumulated for a period of time designated by the accumulation area control signal. In a practical accumulating operation, the maximum value of one horizontal period may be illustratively accumulated for one field. The accumulated data is supplied as evaluation data Dt to the controller 10.

Figure 8A:
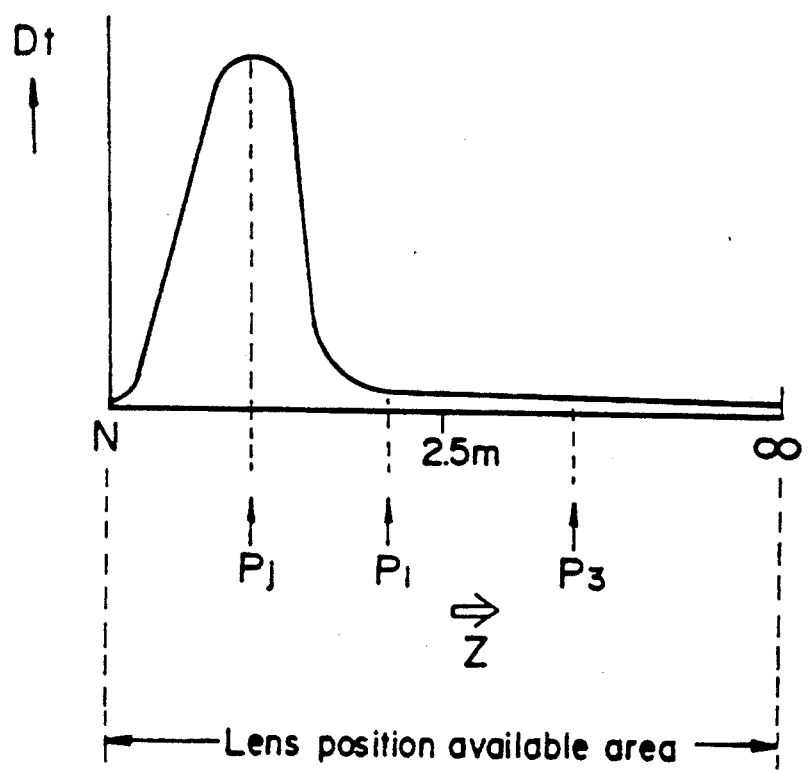
FIGS. 8 A through 8 C are views showing some types of evaluation data used by the auto focus control circuit in the video camera.
Figure 8B:
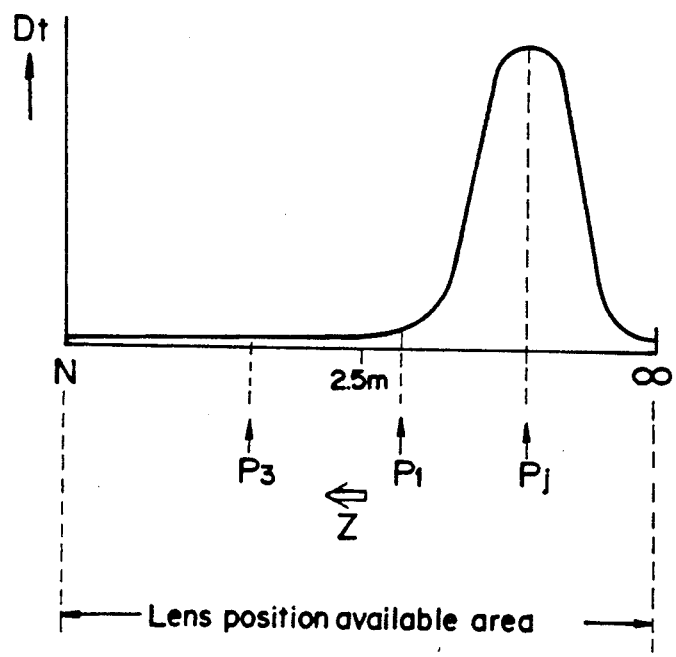
Figure 8C:
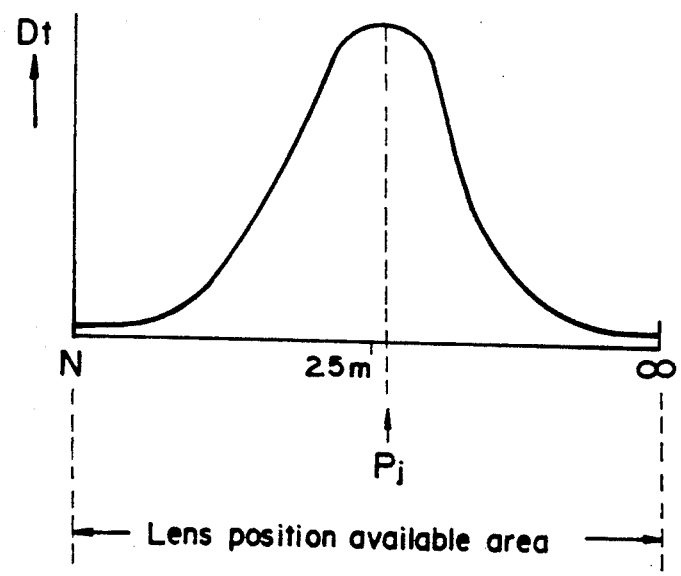

Using the evaluation data Dt supplied, the controller 10 provides mountain climbing control over auto focus operations. In a typical auto focus operation, the focus lens is driven from an out-of-focus state through a just-focus state and on to again an out-of-focus state. During the transition, the distribution of the spectrum components is measured along with their intensities. In the out-of-focus state, the spectrum components are on the low frequency side and their intensities are also low. Close to the just-focus state, the spectrum components are on the high frequency side and their intensities become high. As shown in FIGS. 8 A through 8 C, the accumulated data provides various curves regarding various types of objects. Therefore, the lens is automatically focused when driven to a point $P_j$ at which the accumulated data of the high-frequency components extracted from the video signal is maximized.

The controller 10 has a software-based comparing means for comparing consecutively input and accumulated data so as to find the point at which the accumulated data Dt is maximized. Also contained in the controller 10 is a means for obtaining the rate of change of the accumulated data $Dt_n$ with respect to the immediately preceding accumulated data $Dt_{n-1}$, the obtained rate of change being compared with a predetermined reference rate of change K.

A focus lens motor driver 11 drives driving motors 2 in accordance with driving direction control signals $S_F$ and $S_B$ from the controller 10. A driving speed control signal $S_S$ is supplied to the focus lens motor driver 11 via a D/A converter 12. The signal $S_S$ causes the driver 11 to determine the lens driving speed. In an auto focus operation, the driving direction control signals $S_F$ and $S_B$ as well as the driving speed control signal $S_S$ are generated under mountain climbing control. The driving direction control signal $S_F$ drives the lens in the telephoto (∞) direction; the driving direction control signal $S_B$ drives the lens in the wide angle (N) direction.

A focus lens position detector 13 detects the focus lens position as follows: A reflective film is illustratively formed on a predetermined area of the focus lens cylinder. Light-emitting diodes apply detecting light to the cylinder. A check is made to see if the position of the cylinder rotating in direction A or B is the one in which the reflected light is available. The detection signal is input to the controller 10 via an A/D converter 14.

With this embodiment, the position detector 13 detects two things: that the lens has reached its edge position (maximum wide angle position or maximum telephoto position), and that the lens has reached, for instance a 2.5-meter focus point.

Figure 9:
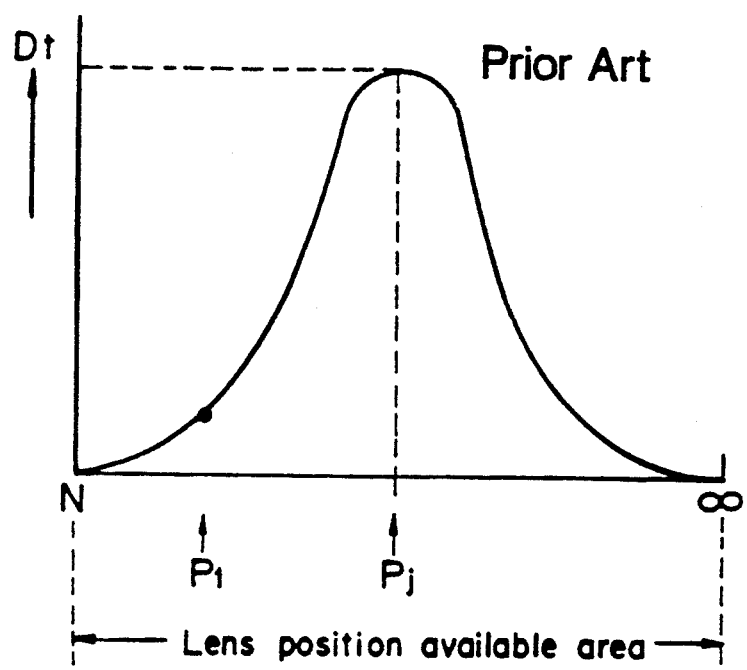
FIG. 9 is a view illustrating another typical setup of mountain climbing control for use with the video camera.
Figure 10:
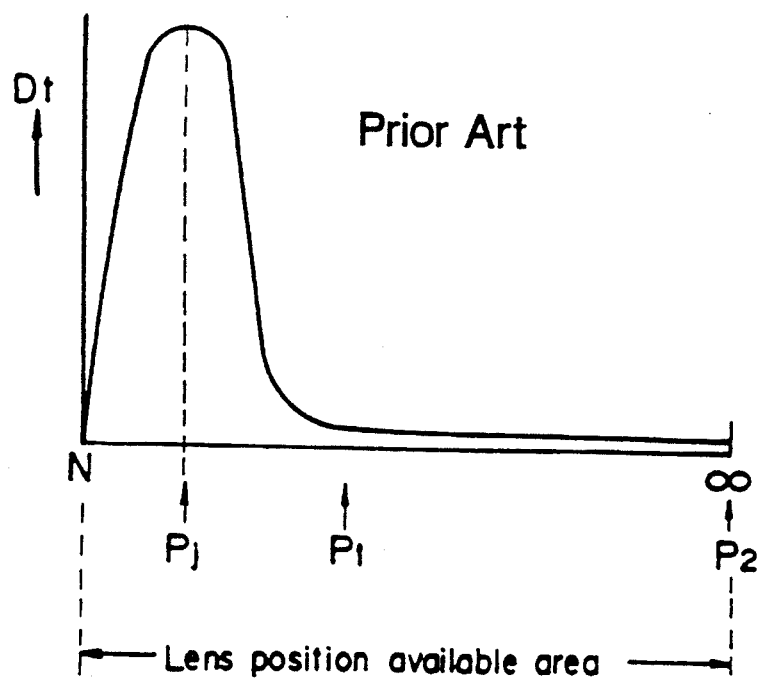
FIG. 10 is a view depicting how the zoom lens is moved in reverse to an edge within the macro region by the auto focus control circuit in the video camera.

With the embodiment containing the above-described auto focus control circuit, the controller 10 provides mountain climbing control based on the evaluation data Dt to automatically bring the focus lens into focus. The auto focus operation (under mountain climbing control) is attained in five modes of control: (1) driving start mode, (2) direction detecting mode, (3) focus point passing mode, (4) reverse mode, and (5) fine-tuning mode.

Where the lens is illustratively positioned at point $P_1$, as depicted in FIG. 9, the lens is first moved in a given direction in driving start mode (1). Then, a direction detecting mode (2) is selected. In this mode, a direction determining operation is carried out in accordance with the evaluation data $Dt_n$, $Dt_{n+1}$... being consecutively accumulated while the lens is being moved. In a focus point passing mode (3), the lens is moved in the determined direction while the evaluation data Dt is being detected. At this time, the consecutively acquired evaluation data Dt becomes greater as the lens approaches its just-focus point. When the lens moves past the just-focus point $P_j$, the evaluation data Dt obtained past that point is lower than the immediately preceding evaluation data Dt. This drop in the evaluation data reveals that the lens has indeed moved past the just-focus point, and a reverse mode (4) is selected. In the reverse mode (4), the direction of lens movement is reversed. The lens is moved back a little toward the just-focus point $P_j$. Finally, in a fine-tuning mode (5), the lens is fine-tuned in the N and ∞ directions until the just-focus point $P_j$ is reached where the evaluation data Dt is maximized.

Figure 18:
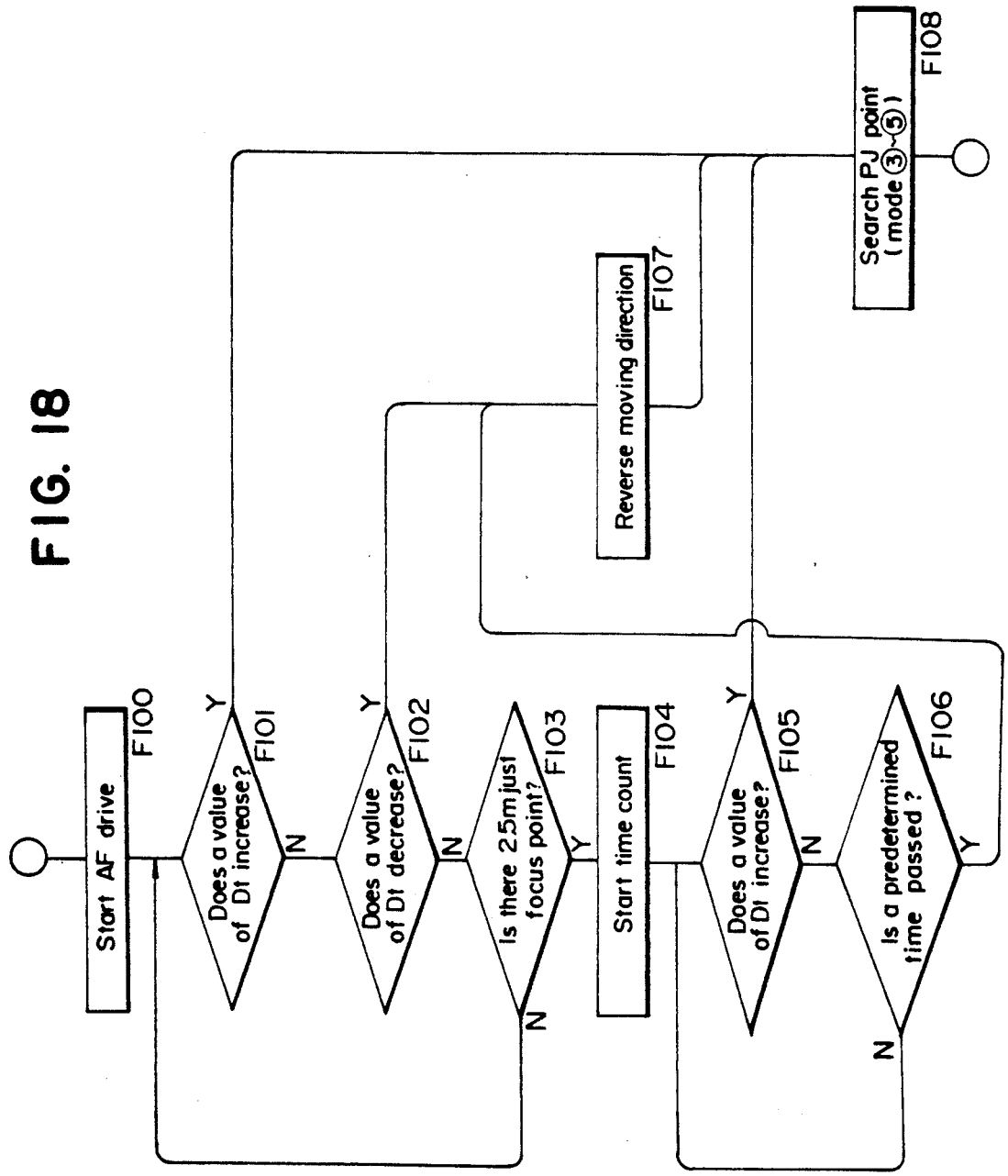
FIG. 18 is a flowchart depicting how the video camera is illustratively focused automatically.

With this embodiment, an intermediate point detecting operation is carried out during the auto focus operation controlled by the controller 10, as described in the flowchart of FIG. 18.

In step F100 of FIG. 18, the controller 10 enters the driving start mode (1) and outputs the driving speed control signal $S_S$ as well as the driving direction control signal $S_F$ or $S_B$ to drive the lens in a corresponding direction. In step F101, the controller 10 first enters direction detecting mode (2) and performs a direction determining operation. That is, when the evaluation data Dt keeps increasing as the lens is moved, the controller 10 judges that the peak of the data exists on an extension of the current lens movement, and step F108 is reached. In step F108, the focus lens is brought to the just-focus point $P_j$ in modes (3) through (5). If the evaluation data Dt keeps decreasing as the lens is moved, step F102 is reached in which the controller 10 judges that the peak of the data exists in the reverse direction of the current lens movement. Then step F107 is reached. In step F107, the controller 10 outputs the other driving direction control signal, $S_B$ or $S_F$, to reverse the direction of lens movement. Thereafter, step F108 is reached in which the focus lens is brought as before to the just-focus point $P_j$ in modes (3) through (5).

If the direction determining operation does not yield meaningful results, i.e., if the evaluation data Dt is unavailable or remains constant at a very low level while the lens is moving in one direction, step F103 is reached. In step F103, a check is made to see if the focus lens has reached the 2.5-meter focus point. When the 2.5-meter focus point is attained, step F104 is reached in which a built-in counter means starts counting time. This is typically the case with the example shown in FIG. 8 (A) or 8 (B) where the focus lens is moved in mode (1) from point $P_1$ in the arrowed direction Z.

In step F105, a check is made to see if the evaluation data Dt increases as the lens keeps moving in the current direction before time is up on the counter means. If the data Dt is found to be on the increase, step F108 is reached in which the focus lens is brought to the just-focus point $P_j$ in modes (3) through (5).

If the appropriate evaluation data Dt is not available before time is up on the counter means in step F106, step F107 is reached in which the direction of lens movement is reversed. This is illustratively the case with the example depicted in FIG. 8 (A) or 8 (B). In these examples, the time required to move the lens from the 2.5-meter focus point to point $P_3$ is counted. The lens is moved in the current direction in step F106, up to point $P_3$ where time is up. If the appropriate evaluation data Dt is not available before time is up at point $P_3$, the controller 10 judges that the lens is moving away from the just-focus point, and reverses the direction of lens movement accordingly in step F107. The lens is then driven in reverse and comes to a point where the evaluation data Dt is available, whereupon step F108 is reached and the operations of modes (3) through (5) are carried out. The focus lens is thus brought to the just-focus point $P_j$.

When the controller 10 controls the carrying out of the above operations, the video camera of this embodiment has no need for one of the hitherto-required redundant operations with the prior art: that its focus lens is to be moved in reverse direction in mode (1) all the way up to its maximum position even if that direction is on the opposite side of the just-focus point, and to come back thereto to complete the focusing operation.

The intermediate point may alternatively be established somewhere other than the 2.5-meter focus point. All that is required is that the intermediate point be appropriate for the characteristics of a given video camera. The period of time counted starting from the 2.5-meter focus point may also be determined as needed in accordance with the characteristics of the implemented equipment in question.

The time that elapses from the intermediate point on (i.e., a period of movement between $P_1$ and $P_3$ in the above embodiment) may be alternatively judged not by counting time but by physically detecting point $P_3$.

In carrying out the auto focus operation with the embodiment in the above-described five modes, the controller 10 checks to see if any drop in the accumulated data is attributable to the lens actually passing the just-focus point under mountain climbing control in focus point passing mode (3).

Figure 19:
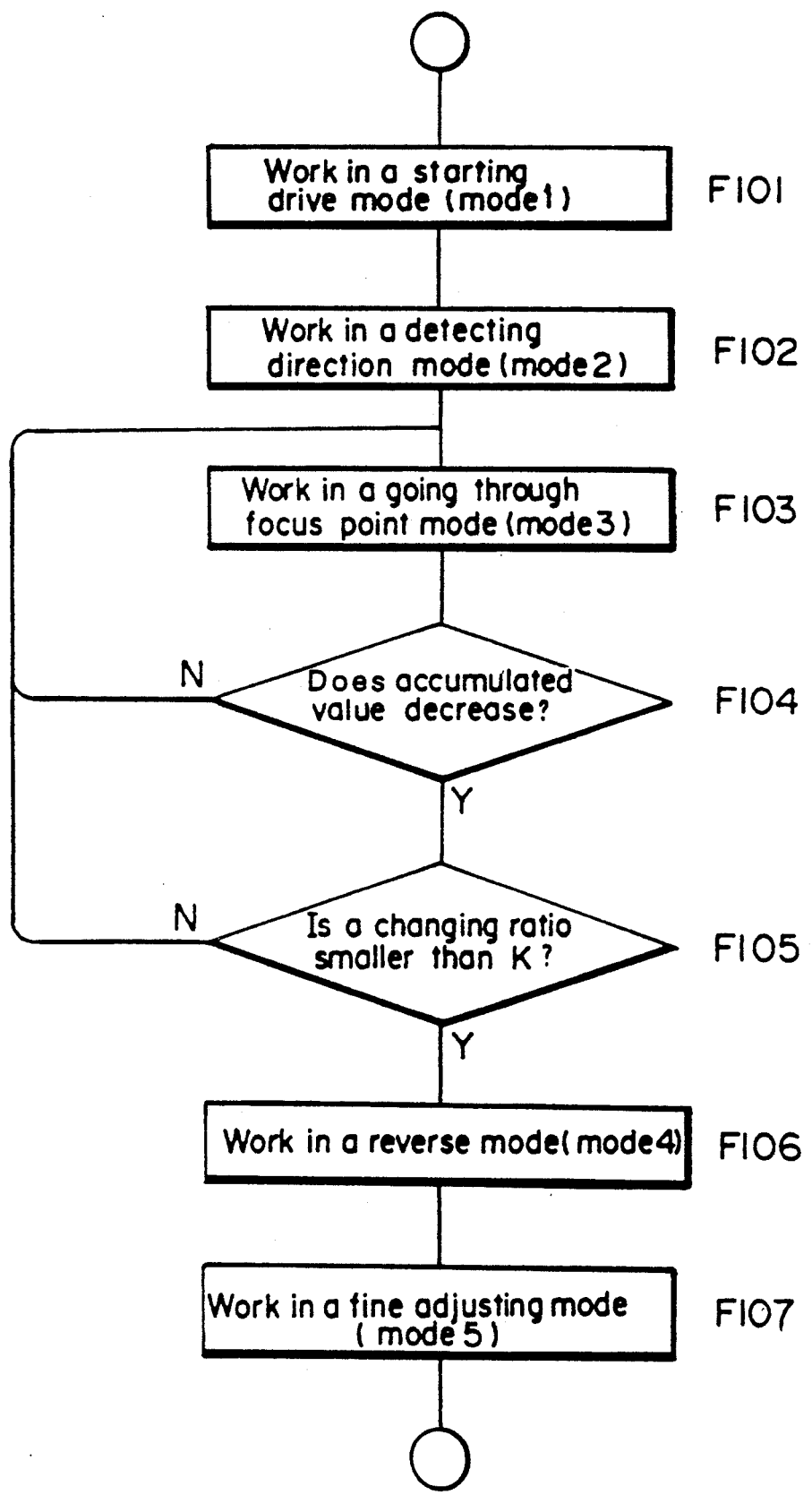
FIG. 19 is a flowchart continued to that of FIG. 18, also describing how the video camera is illustratively focused automatically.

That is, the controller 10 operates for auto focus operation control as depicted in the flowchart of FIG. 19.

Figure 11:
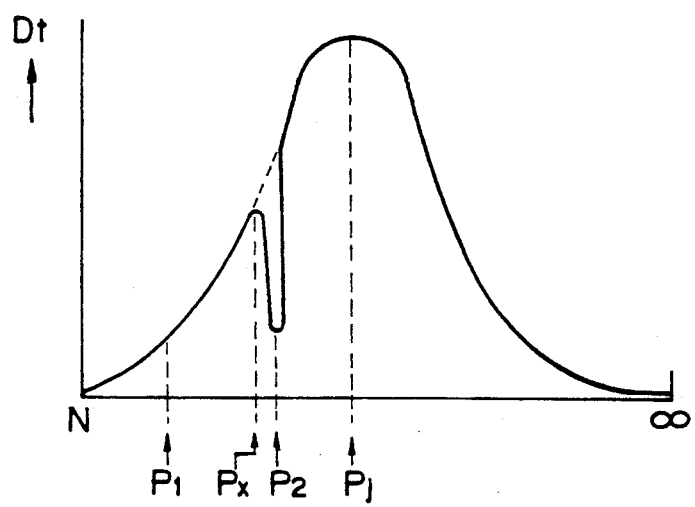
FIG. 11 is a view showing how the curve of the data accumulated by the auto focus control circuit in the video camera illustratively behaves when another object moves crosses between the video camera and its initial object.
Figure 12:
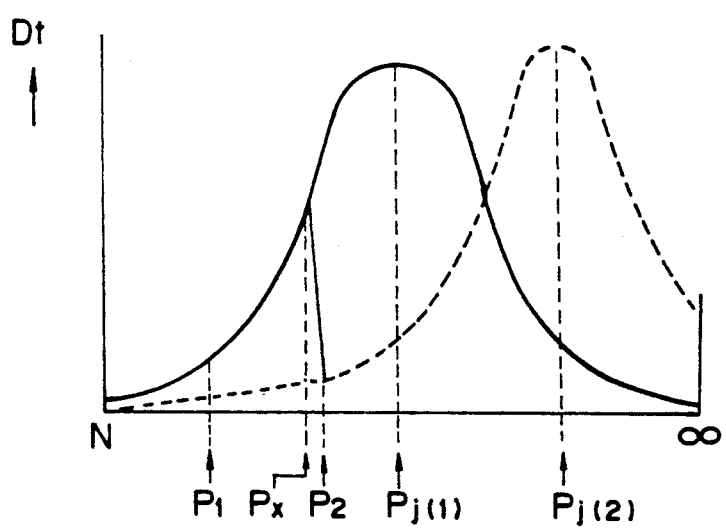
FIG. 12 is a view depicting how the curve of the data accumulated by the auto focus control circuit in the video camera illustratively behaves when the video camera is panned from one object to another.

In step F101 of FIG. 19, work in the driving start mode (1) is carried out. In step F102, the work in direction detecting mode (2) is performed. In step F103, focus point passing mode (3) is reached in which the lens is driven toward the peak of the accumulated data. Until the lens reaches the peak, a check is made in step F104 to see if an accumulated value $Dt_n$ at a given point becomes smaller than the immediately preceding accumulated value $Dt_{n-1}$. If any drop in the accumulated data is detected, the controller 10 enters step F105 and checks to see if the drop is abrupt. It should be noted that the reverse mode (4) is not immediately reached following the step F104. The controller 10 has a predetermined reference rate of change K with which to compare the drop in the accumulated data. If the reference rate K and the drop fulfill the following relationship:

$$\frac{(Dt_{n-1} - Dt_n)}{\Delta t} \geq K$$

then the controller 10 considers the drop to be an abrupt change in the accumulated data and concludes that the drop is not attributable to the lens having passed the peak point. In that case, the drop is ignored and the lens is allowed to keep moving in the same direction. These operations are carried out successively in steps F103, F104 and F105. In the case of FIG. 11, the lens is driven from point $P_1$ in the $\infty$ direction under auto focus control. If there is a sudden drop in the accumulated data during the lens movement, the drop is ignored and the lens keeps moving in the same direction. Also in the case of FIG. 12, the abrupt drop at point $P_2$ does not cause the lens to be reversed in its movement and headed toward point $P_x$ in reverse mode (4); the lens keeps moving in the $\infty$ direction toward the just-focus point $P_j$ following the panning.

The accumulated data decreases while the focus point passing mode (3) is in effect. It is only after the relationship $$\frac{(Dt_{n-1} - Dt_n)}{\Delta t} < K$$

is fulfilled that the controller 10 can concludes that the peak is passed. Then, the reverse mode (4) is selected in step F106 of FIG. 19 to reverse the direction of lens movement. In step F107, the fine-tuning mode (5) is selected to bring the focus lens to the just-focus point $P_j$.

In this manner, the above-described embodiment keeps its controller 10 from erroneously concluding that given an abruptly decreased accumulated value illustratively attributable to a person walking across in front of the lens or to a sudden panning, the value immediately preceding the drop is to be the peak. Thus, the focus lens does not stop at an out-of-focus point while being automatically focused.

With this embodiment, whether or not the decrease in accumulated data is abrupt is determined by the difference measured within a certain period of time. Alternatively, a reference rate of change K' may be set up for comparison with $(Dt_{n-1}/Dt_n)$, whereby a decision is made based on the amount of the decrease in the accumulated data. Many other methods and arrangements may also be provided to implement the same function.

The reference level of the decrease in accumulated data, i.e., the level at which all drops in the data are judged to be normal or abrupt, may be suitably established in accordance with the characteristics of the video camera implemented.

Figure 2:
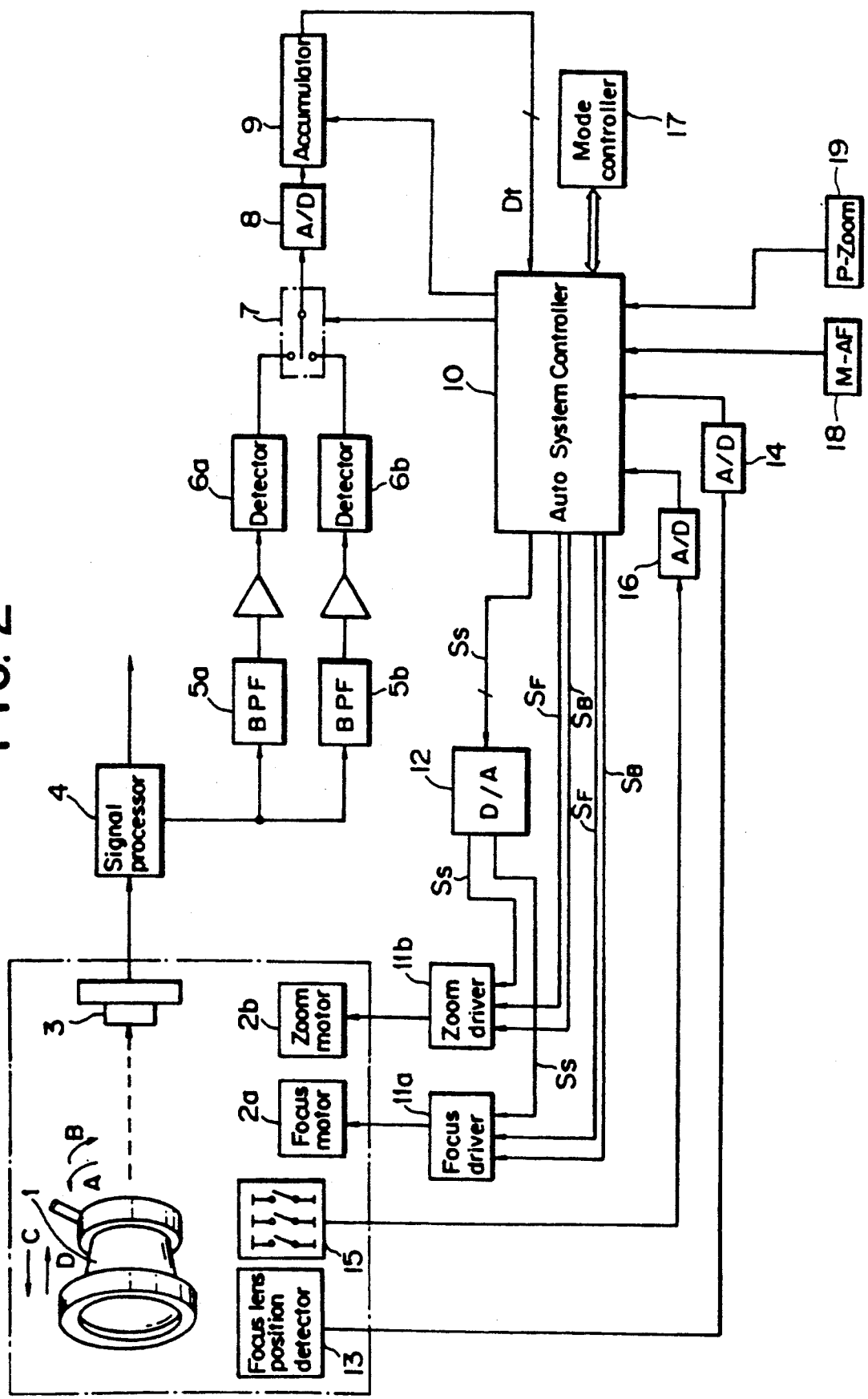
FIG. 2 is a block diagram depicting another embodiment of the auto focus control circuit.

FIG. 2 is a block diagram showing another embodiment of the auto focus control circuit in the video camera according to the invention. In FIG. 1, reference numeral 1 is a lens system wherein a focus lens and a zoom lens are rotated by driving motors 2a and 2b in arrowed directions A and B and are thereby moved in arrowed directions C and D for focus position control. With this lens system, the focus lens and the zoom lens are automatically focused, respectively, in the normal region and the macro region for normal and macro auto focus operations under mountain climbing control based on a contrast detecting method (i.e., a frequency separating method) to be described later. In this embodiment, the focus lens and zoom lens are in focus at longer distances when driven in direction A (i.e., moved in direction C), and come into focus at shorter distances when driven in direction B (i.e., moved in direction D).

Reference numeral 3 is a (CCD) charge coupled device image pickup tube that photographs an object via the lens system 1. The CCD image pickup tube outputs the image signal to a signal processor 4.

The signal processor 4, comprising a process circuit and a color encoder, generates a luminance signal and a chrominance signal based on the output signal from the CCD image pickup tube 3.

Band pass filters 5a and 5b are supplied with the luminance signal from the signal processor 4. The band pass filters 5a and 5b illustratively have center frequencies of 100 kHz and 500 kHz, respectively. These filters extract predetermined frequency components from the luminance signal supplied by the signal processor 4. The extracted frequency components are supplied via amplifiers to detectors 6a and 6b where the levels of the frequency components are detected.

A switching circuit 7 determines, under control of an auto focus system controller (simply called the controller) 10, which of the two outputs of the detected frequency components is to be used, the frequency components having been extracted by the band pass filters 5a and 5b. For example, if the object of the camera is in high contrast against its background, the output from the band pass filter 5a is selected; if the object is in low contrast against its background, the output from the band pass filter 5b is selected.

The output selected by the switching circuit 7, i.e., the signal representing the level of a predetermined signal component from within the luminance signal, is converted to digital format by an A/D converter 8. The digital output from the A/D converter 8 is supplied to an accumulator 9. The accumulator 9 is supplied with an accumulation area control signal from the controller 10. The level data of the predetermined frequency component, supplied from the A/D converter 8 after extraction from the luminance signal, is accumulated for a period of time designated by the accumulation area control signal. In a practical accumulating operation, the maximum value of one horizontal period may be illustratively accumulated for one field. The accumulated data is supplied as evaluation data Dt to the controller 10.

Figure 3:
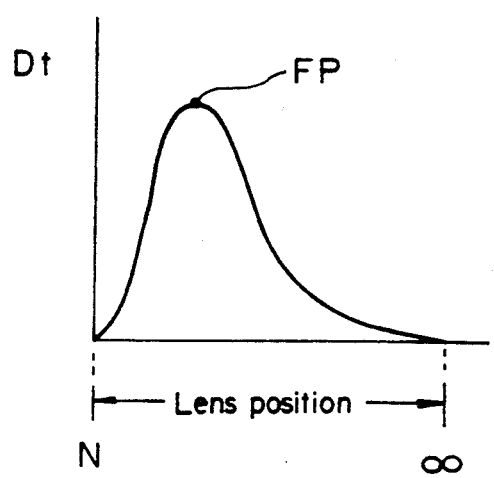
FIG. 3 is a view illustrating the operating principle of mountain climbing control for use with the video camera.

Using the evaluation data Dt supplied, the controller 10 provides mountain climbing control over auto focus operations. In a typical auto focus operation, the focus lens or zoom lens is driven from an out-of-focus state through a just-focus state to again an out-of-focus state. During the transition, the distribution of the spectrum components is measured along with their intensities. In the out-of-focus state, the spectrum components are on the low frequency side and their intensities are also low. Close to the just-focus state, the spectrum components are on the high frequency side and their intensities become high. Thus, auto focus control is effected by driving the lens in such a way that the accumulated data of the high-frequency components extracted from the video signal is maximized. The focus lens and the zoom lens are driven axially in the normal and macro regions, respectively, within the lens movement area ($N \leftrightarrow \infty$) as shown in FIG. 3. During the lens movement, a search is made for a point FP at which the evaluation data Dt is maximized (mountain climbing control). This provides auto focus control over both regions.

A focus lens motor driver 11a and a zoom lens motor driver 11b drive driving motors 2a and 2b, respectively, in accordance with driving direction control signals $S_F$ and $S_B$ from the controller 10. A driving speed control signal $S_S$ is supplied to the motor drivers 11a and 11b via a D/A converter 12. The signal $S_S$ causes the drivers 11a and 11b to determine the lens driving speed. In an auto focus operation, the driving direction control signals $S_F$ and $S_B$ as well as the driving speed control signal $S_S$ are generated under mountain climbing control. The driving direction control signal $S_F$ drives the lens in the telephoto direction; the driving direction control signal $S_B$ drives the lens in the macro side direction.

A focus lens position detector 13 detects the focus lens position as follows: A reflective film is illustratively formed on a predetermined area of the focus lens cylinder. Light-emitting diodes apply detecting light to the cylinder. The position of the focus lens is detected by checking to see if the lighted position coincides with the reflective film portion, i.e., if the position of the cylinder rotating in direction A or B is the one in which the reflected light is available. The detection signal is input to the controller 10 via an A/D converter 14.

Figure 4:
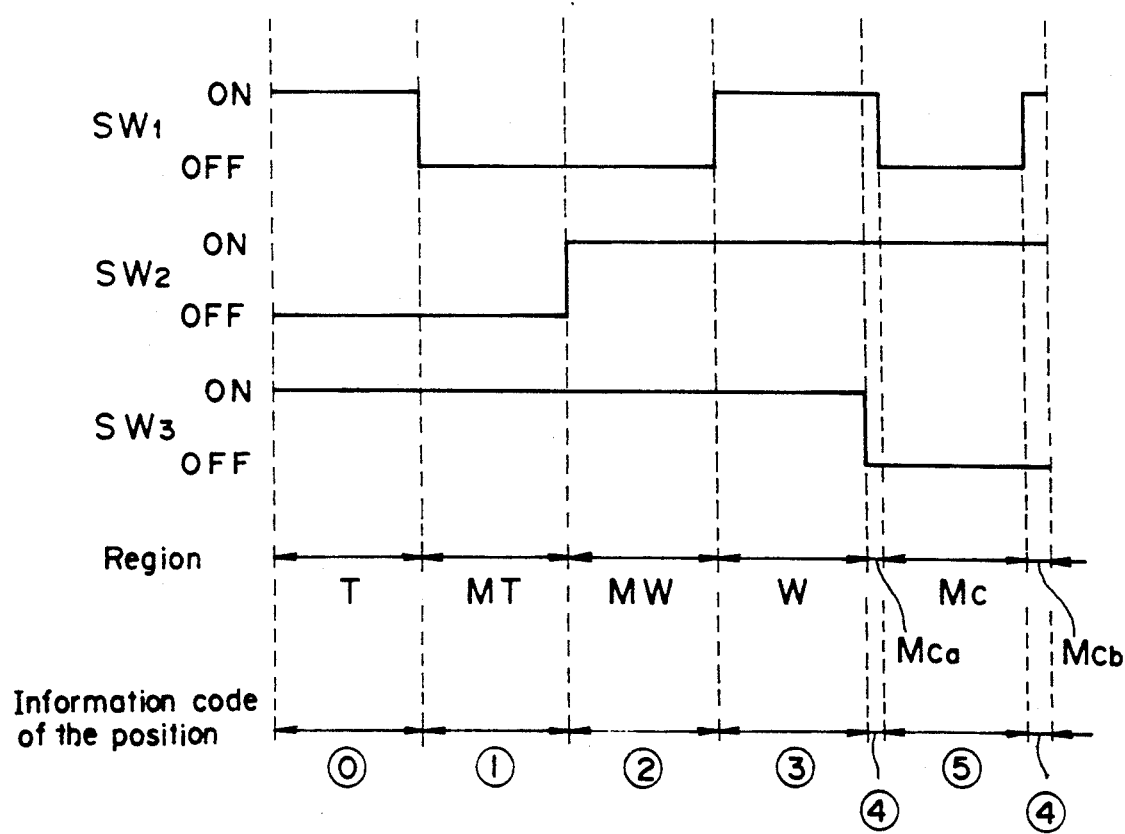
FIG. 4 is a view showing typical detection signals regarding zoom lens positions, the signals being generated by a zoom position detector in the video camera.
Figure 5:
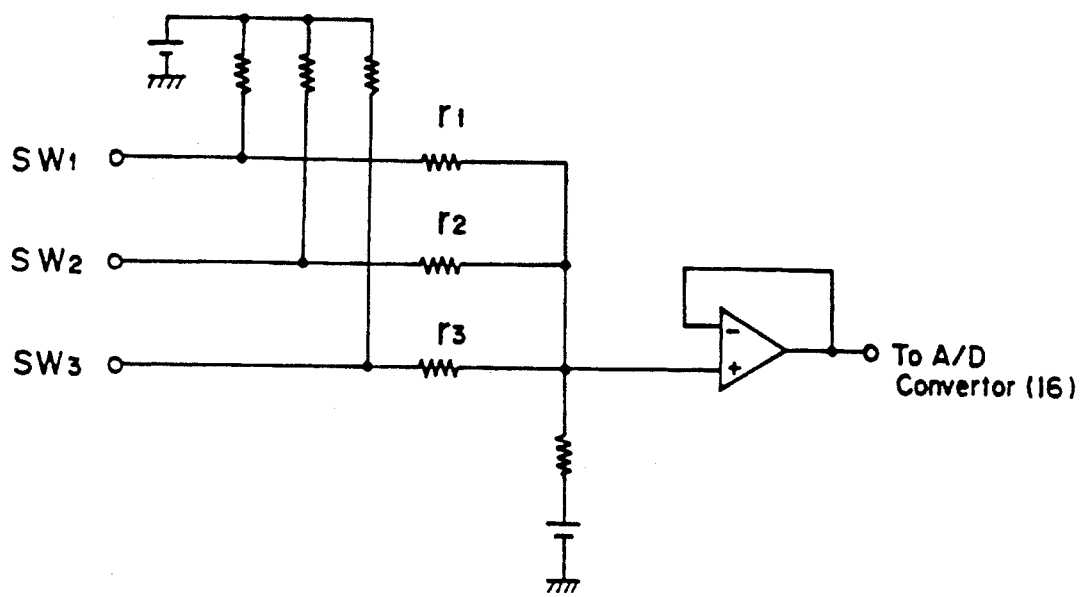
FIG. 5 is a circuit diagram of a typical circuit for coding signals from the zoom position detector.

A zoom lens position detector 15 is constituted by three microswitches $SW_1$ through $SW_3$. The zoom lens cylinder illustratively has suitable grooves corresponding to the microswitches $SW_1$-$SW_3$. The sliding member of each microswitch is turned on and off upon contact with the corresponding groove, allowing the zoom lens position to be detected. For example, the microswitches $SW_1$-$SW_3$ are each turned on and off as shown in FIG. 4 with respect to the zoom lens positions from the telephoto setting T to the macro edge setting MCb. The on-off information from each of the microswitches $SW_1$-$SW_3$ is illustratively weighted, as depicted in FIG. 5, by factors r1, r2 and r3 before being supplied to an A/D converter 16. The weighted information is digitally coded by the A/D converter 16 into position detection signals representing the respective regions. In FIG. 4, the position detection signals (position information codes) are numbered (1) through (5) for explanatory purposes.

A mode controller 17, in communication with the controller 10, illustratively allows a view finder of the video camera to give indications of normal mode or macro mode selected.

A macro mode switch 18 is operated by the user to bring the controller 10 into a macro mode in which a macro auto focus operation is carried out. Specifically, the zoom lens is driven under mountain climbing control and brought into focus regarding an object closer than that of the widest angle setting in normal mode.

A power zoom switch 19 is operated by the user to drive the zoom lens as desired in normal mode. Specifically, this switch allows the user to drive the zoom lens at will (between telephoto and wide angle settings) while the focus lens is being automatically focused under mountain climbing control in normal mode between the maximum telephoto and maximum wide angle setting.

With the embodiment containing the above-described auto focus control circuit, the controller 10 provides mountain climbing control based on the evaluation data Dt to automatically bring the focus lens or the zoom lens into focus in the normal or macro region. The position detection signals (i.e., position information codes) from the zoom lens position detector 15 of this embodiment come in five types, (1) through (5), coded according to the on-off information from the microswitches $SW_1$-$SW_3$. When either of the macro edge areas MCa and MCb is detected, the same position information code (4) is provided. Thus, if the position information code (4) is detected during operation, the controller 10 must have means to determine whether the zoom lens is positioned in the area MCa or MCb.

Needless to say, the above distinction between the two areas is required during the macro auto focus operation with the zoom lens positioned within the macro region. In an operation within the normal region (i.e., in the normal mode), the zoom lens is kept from entering the macro region. It is only after the user has operated the macro mode switch 18 that the zoom lens enters the macro region. Control measures for keeping the zoom lens out of the macro region in normal mode will be described later.

In the macro mode, the zoom lens is normally positioned in the macro region. If the position information code (4) is obtained in this mode, the distinction between MCa and MCb is made by checking the direction of zoom lens movement. That is, the controller 10 is cognizant of the lens driving direction because the zoom lens is automatically focused with the driving direction control signals $S_F$ and $S_B$ as well as the driving speed control signal $S_S$ generated under mountain climbing control based on the evaluation data Dt. Thus, when the driving direction control signal $S_F$ is output, the zoom lens is driven in the telephoto direction. If the position information code (4) is detected at this point, the zoom lens is judged to be positioned in the macro edge area MCa. Conversely, when the driving direction control signal $S_B$ is output, the zoom lens is driven in the maximum macro direction. The position information code (4) detected at this point is judged to indicate that the zoom lens is positioned in the macro edge area MCb.

For this reason, there is no problem with the same position information code being used for both macro edge areas as far as the macro auto focus operation is concerned. The use of the same position information code (4) does pose a problem as to the correct distinction between macro edge areas MCa and MCb in two cases: (a) where the position information code (4) is detected upon initial power-up; and (b) where the zoom lens moves from the normal to the macro region after the macro mode switch 18 is operated and macro mode is selected thereby.

With this embodiment, the controller 10 has software-based means (outlined below) to prevent erroneous operations in the above two cases.

That is, the controller 10 has driving means to drive the zoom lens in the telephoto direction if a macro edge area detection signal is obtained upon power-up. The controller 10 has control means to stop driving the zoom lens and place the video camera in in normal mode if the position detection signal obtained when the zoom lens left the macro edge area after power-up indicates the normal region, the control means further bringing the zoom lens back to the initial position in effect upon power-up and placing the video camera in macro mode if the position detection signal indicates the macro region. The controller 10 also has driving means for driving the zoom lens in the macro direction if the macro mode switch 18 is operated. The controller 10 has determining means for checking to see if the signal indicating an entry into the macro edge area by the zoom lens means that the detected entry is the first one into the macro edge area since the lens began moving in the macro direction. Furthermore, the controller 10 has cut-off means for cutting off macro edge detection information until the zoom lens leaves the macro edge area if the above determining means finds that the detected entry by the zoom lens into the macro edge area is the first one. These means are all constituted by software arrangements and provide the kinds of control illustrated in FIGS. 13 and 14.

Figure 13:
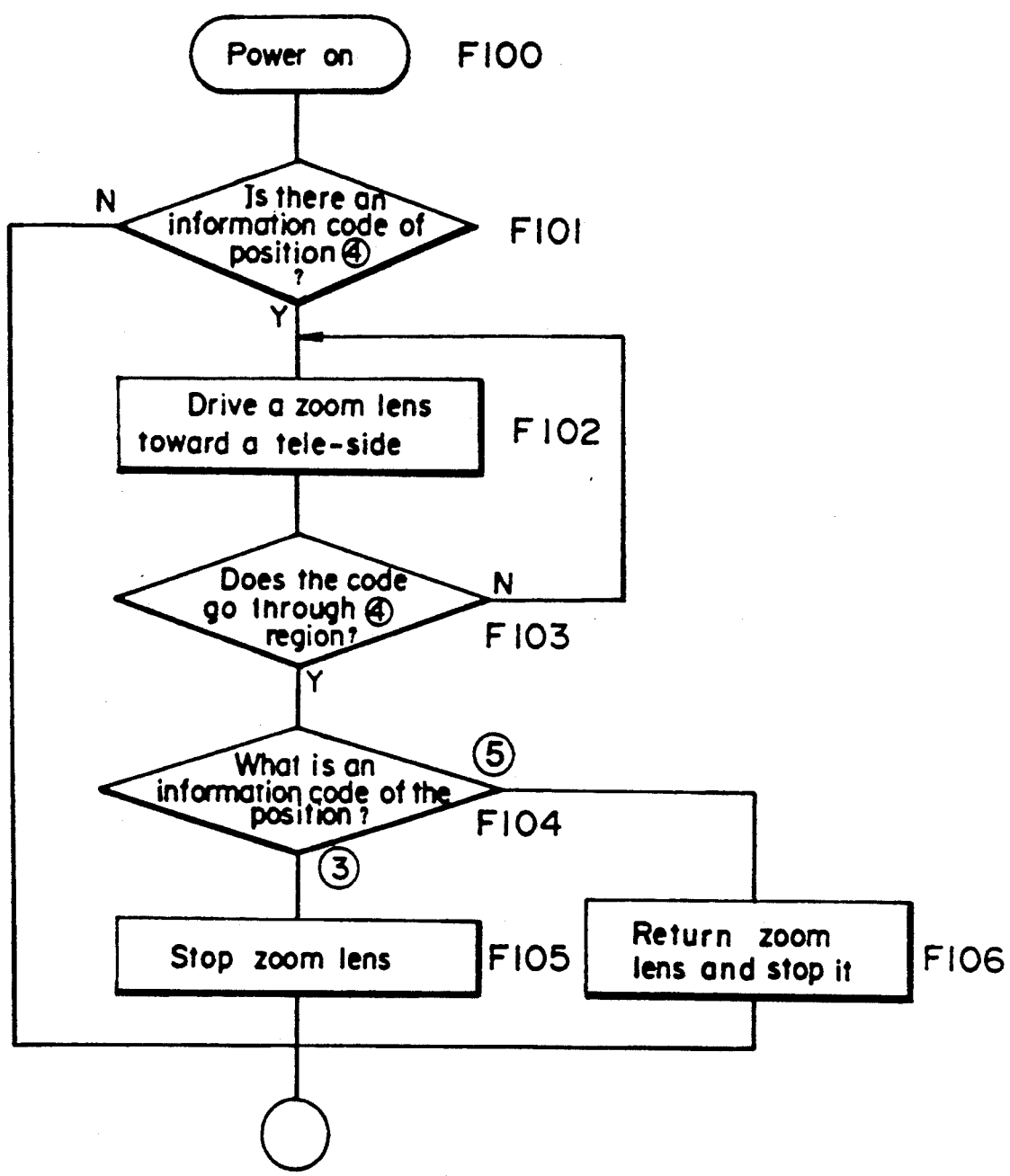
FIG. 13 is a flowchart showing how one embodiment of the auto focus control circuit in the video camera is controlled upon power-up.

(a) Control upon power-up (with reference to FIG. 13)

In step F100, power is applied. In step F101, a check is made to see if the position information code detected by the zoom lens position detector 15 is numbered (4). If the code is any of (1), (2), (3) and (5), the zoom lens position is obtained unmodified, and there is no problem with subsequent operational control. If the position information code (4) is obtained in step F101, no meaningful distinction is made between the macro edge areas MCa and MCb. In that case, step F102 is reached in which the zoom lens is first driven in the telephoto direction. In step F103, a check is made to see if the zoom lens has left the macro edge area in question. With the lens having left the macro edge area, step F104 is reached in which the position information code is verified. If the position information code (3) is obtained in step F104, step F105 is reached in which the zoom lens is stopped and the controller 10 enters normal mode for subsequent various kinds of control. This is the case where the zoom lens was positioned in the macro edge area MCa at the time of power-up. The position of MCa differs very little from the maximum wide angle position. Thus immediate, unmodified transition to normal mode poses no problem.

If the position information code (5) is obtained in step F104, step F106 is reached in which the zoom lens is driven in the opposite direction of step F102 for the same period of time thereof. This causes the zoom lens to return to its initial position upon power-up. The controller 10 recognizes the current position of the zoom lens as the macro edge area MCb, and provides a macro mode control thereafter.

The operations above prevent position detection error from occurring when power is applied.

Figure 14:
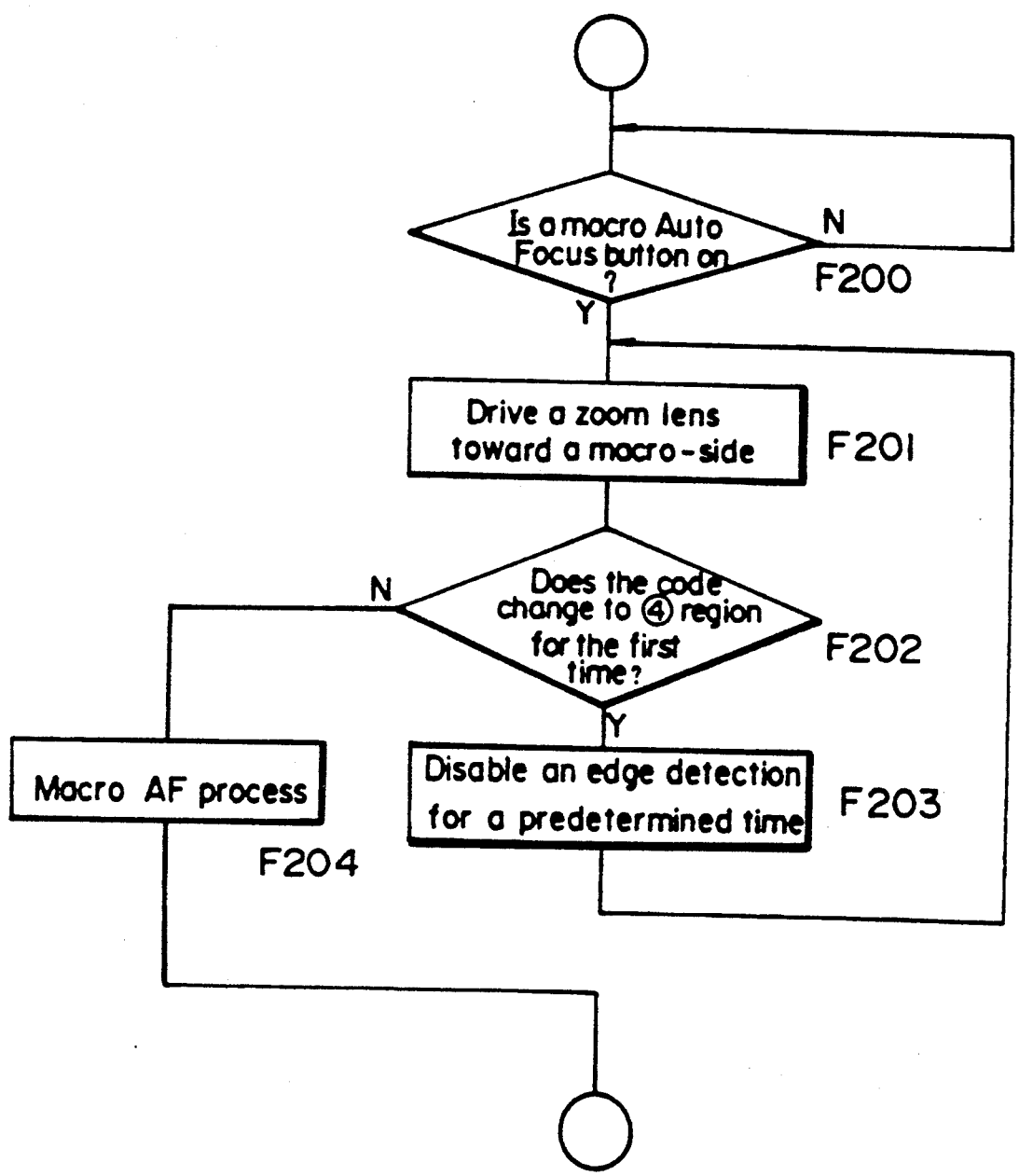
FIG. 14 is a flowchart depicting how the embodiment of the auto focus control circuit in the video camera is controlled at the start of the macro mode.

(b) Control at the start of macro mode (with reference to FIG. 14)

When the macro mode switch 18 is operated in step F200, the zoom lens is moved in the macro direction in step F201. Within the macro region, the zoom lens is placed under mountain climbing control. Before entering the macro region, the zoom lens enters the macro edge area MCa. This entry into the macro edge area by the zoom lens is verified when the position detection code (4) is obtained in step F202. In that case, the zoom lens is moved in the macro direction under control of the driving direction control signal $S_B$. Thus, if distinction were made between MCa and MCb based on the zoom lens driving direction, the lens position would be erroneously judged to be the macro edge area MCb. Such error is prevented as follows: When the position information code (4) is first detected in F202 while the zoom lens is being driven (in step F201), step F203 is reached. In step F203, the detected information is cut off by the cut-off means for a predetermined period of time. The purpose of the cut-off is to keep the information from being used as various kinds of system control information by the controller 10. The cut-off period is set as long as is necessary for the zoom lens to pass the macro edge area MCa.

After the cut-off period has elapsed and the information is released, the zoom lens is already in the macro region. This causes the position information code (5) to be detected. Later, the position information code (4) for the macro edge area MCb may be detected. At that point, step F204 is reached in which a macro auto focus operation is started under mountain climbing control.

Thus, erroneous judgements on detected positions are avoided as described at the start of the macro mode.

With this embodiment, the three-microswitch detection arrangement that generates the signals of FIG. 4 provides accurate position detection in the manner described above. There is no need to develop a complicated detecting mechanism or to provide a large number of switches whereby all positions (areas) are to be detected using different position detection codes.

In the normal mode, it is necessary to keep the zoom lens from entering the macro region even if the user operates the power zoom switch 19 to continue driving the zoom lens in the wide angle direction. This restrictive kind of control is provided by the controller 10 regarding the power zoom switch 19 as depicted in the flowchart of FIG. 15.

Figure 15:
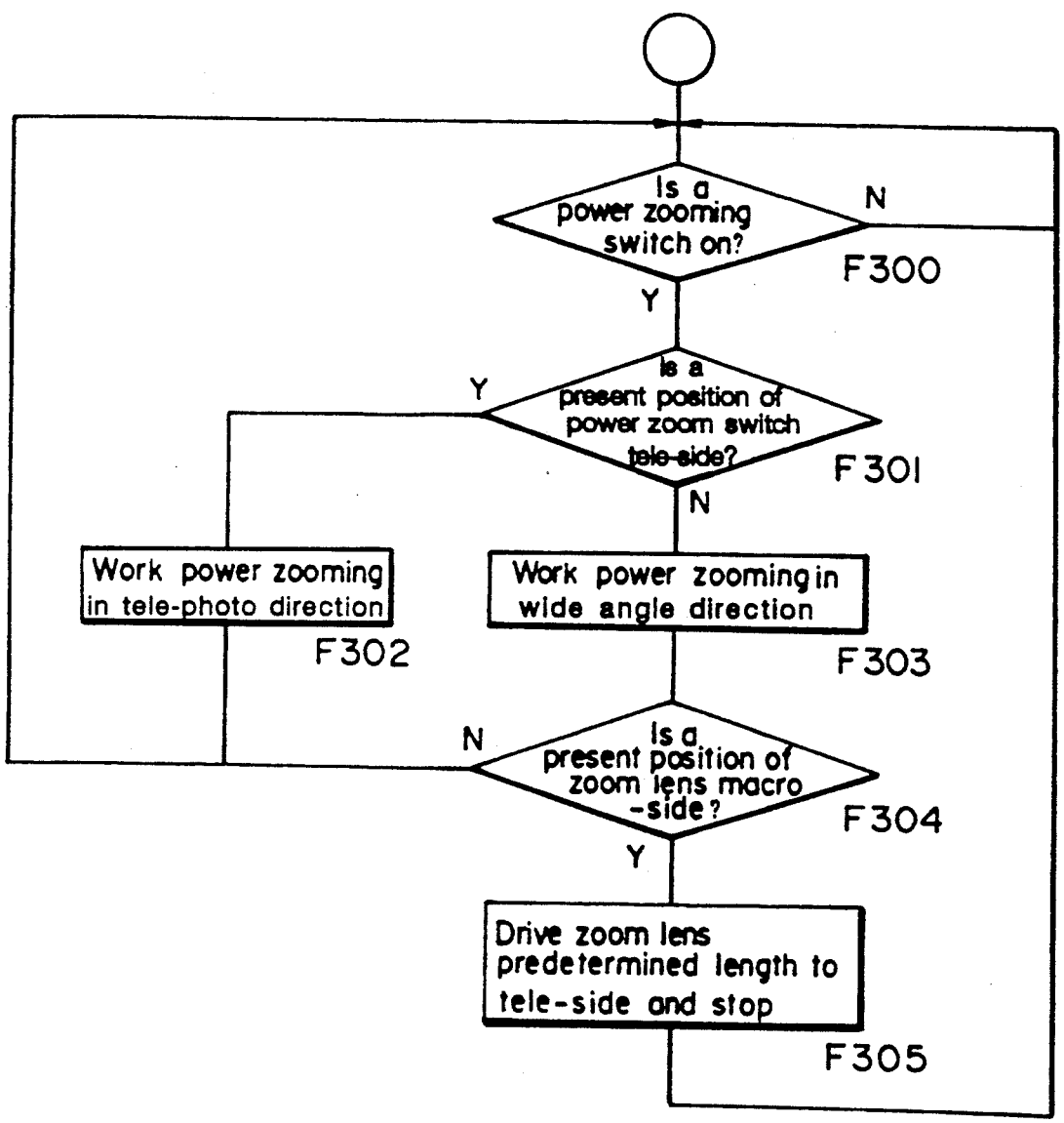
FIG. 15 is a flowchart illustrating how the embodiment of the auto focus control circuit in the video camera is controlled during a powered zooming operation.
Figure 16:
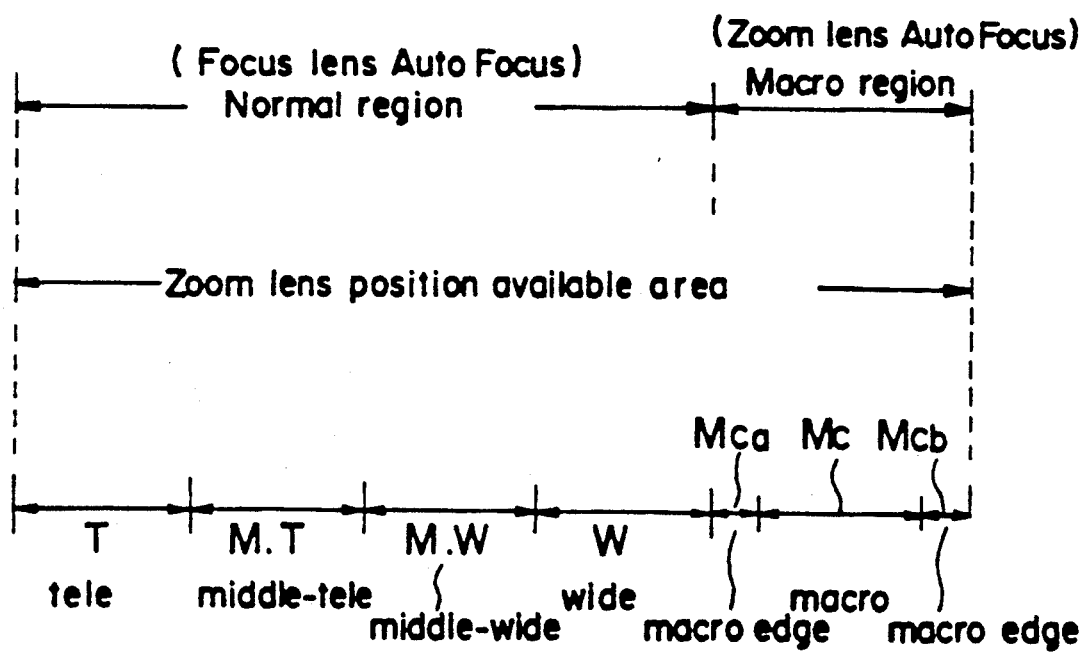
FIG. 16 is a view describing where the zoom lens is differently positioned.

In step F300 of FIG. 15, the user operates the power zoom switch 19. In step F301, a check is made to see if the user's operation is intended to move the zoom lens in the telephoto direction. If the user's operation is so intended, step F302 is reached. In step F302, the controller 10 supplies the zoom lens motor driver 11b with the driving direction control signal $S_F$ and the appropriate driving speed control signal $S_S$ so that the zoom lens is moved in the telephoto direction.

If it is found in step F301 that the user's operation is intended to move the zoom lens in the wide angle direction, step F303 is reached. In step F303, the controller 10 supplies the zoom lens motor driver 11b with the driving direction control signal $S_B$ and the appropriate driving speed control signal $S_S$ so that the zoom lens is moved in the wide angle direction. If the zoom lens reaches the macro edge area during its movement and the position information code (4) is detected in step F304, the zoom lens is driven back in the telephoto direction in step F305 over a predetermined length and is thereupon brought to a stop.

In normal mode where the zoom lens is not automatically driven under mountain climbing control, the above-described manner of control keeps the zoom lens from entering the macro region and thus prevents any impediment to suitable auto focus operations with the focus lens.

The auto focus operation (mountain climbing control) comprises five modes of control: (1) driving start mode, (2) direction detecting mode, (3) focus point passing mode, (4) reverse mode, and (5) fine-tuning mode.

Figure 6:
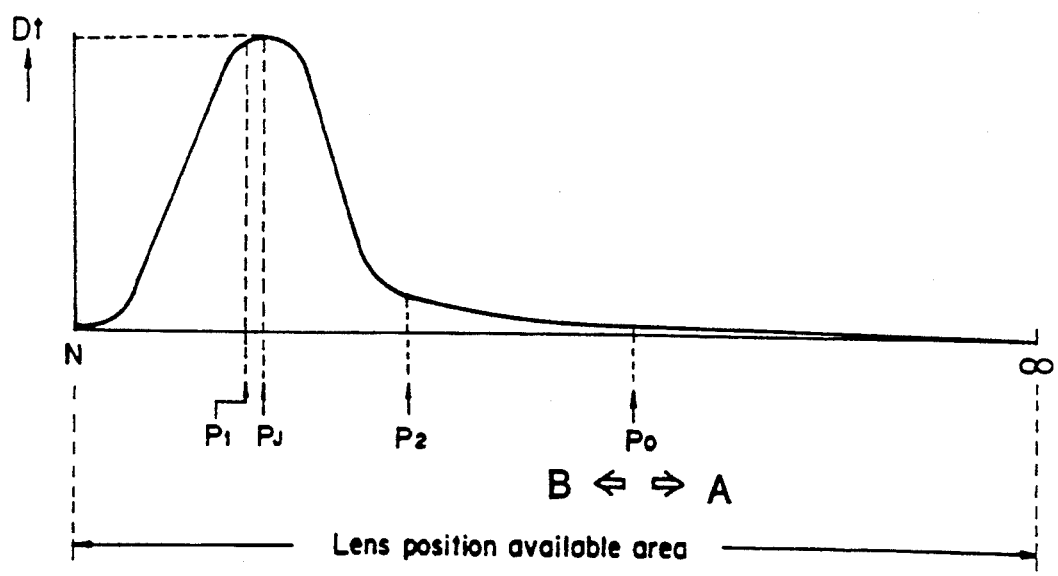
FIG. 6 is a view illustrating a typical setup of mountain climbing control for use with the video camera.

For example, assume that the lens is initially located at point $P_0$ of FIG. 6. As the lens is being moved in one direction (e.g., direction A) in driving start mode (1), the evaluation data Dt is acquired successively. Then direction detecting mode (2) is selected. In this mode, whether or not the lens is moving toward the just-focus point $P_j$ is determined based on the evaluation data $Dt_n$, $Dt_{n+1}$ ... being successively acquired during the lens movement. If it is judged that the just-focus point $P_j$ is not located on an extension of the current direction, the lens is reversed in its movement. In the case of FIG. 6, the lens is reversed to move in the direction B. Then focus point passing mode (3) is selected. In this mode, the lens keeps moving in the direction B while the evaluation data Dt is being detected. During the movement, the consecutively detected evaluation data Dt increases as the lens approaches the just-focus point $P_j$. When the lens reaches point $P_1$, that evaluation data Dt obtained at that point is lower than the immediately preceding evaluation data Dt. This drop in the evaluation data makes it possible to detect that the lens has passed the just-focus point. Thus reverse mode (4) is selected and the lens is reversed in its movement (i.e., to move in the direction A). The lens is allowed to move back a little toward the just-focus point $P_j$. Finally, fine-tuning mode (5) is selected in which the lens is fine-tuned in the directions A and B until the just-focus point $P_j$, where the highest evaluation data Dt is acquired, is reached.

Where the zoom lens is required to be fine-tuned for the auto focus operation under mountain climbing control, the driving speed control signal $S_S$ is generated intermittently with a predetermined pulse width and supplied to the zoom lens motor driver 11b.

For example, the driving speed control signal $S_S$ is normally generated by the controller 10 as a DC signal of a predetermined constant voltage, as shown in FIG. 7(a). The signal is supplied via the D/A converter 12 to the zoom lens motor driver 11b which in turn drives the zoom lens. Where necessary, the software-based means of the controller 10 are used illustratively to supply the driving speed control signal $S_S$ for two vertical synchronizing periods and to stop it for one vertical synchronizing period out of every three periods, as depicted in FIG. 7(b). Alternatively, the driving speed control signal $S_S$ is supplied for one vertical synchronizing period and stopped for two vertical synchronizing periods out of every three, as shown in FIG. 7(c). With the driving speed control signal $S_S$ thus generated intermittently, the zoom lens motor 2b is turned on and off to fine-tune the movement of the lens that requires relatively high levels of driving torque.

Figure 17:
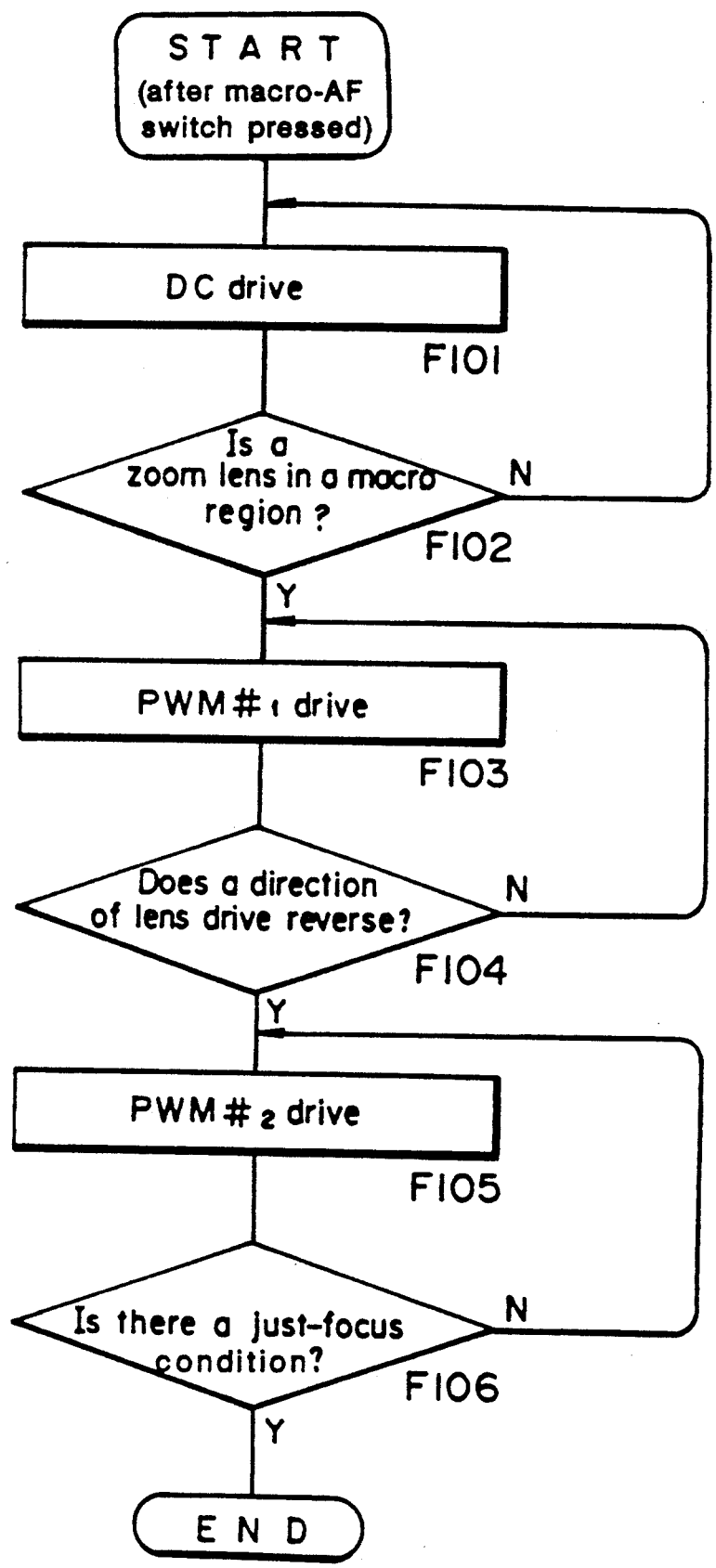
FIG. 17 is a flowchart showing how an embodiment of the zoom lens driving motor speed control method for use with the video camera works.

The flowchart of FIG. 17 shows an example of intermittent generation of the driving speed control signal $S_S$ under mountain climbing control. It is assumed in the following description that the macro region starts at point $P_2$ in FIG. 6 and extends toward the N side.

Figure 7:
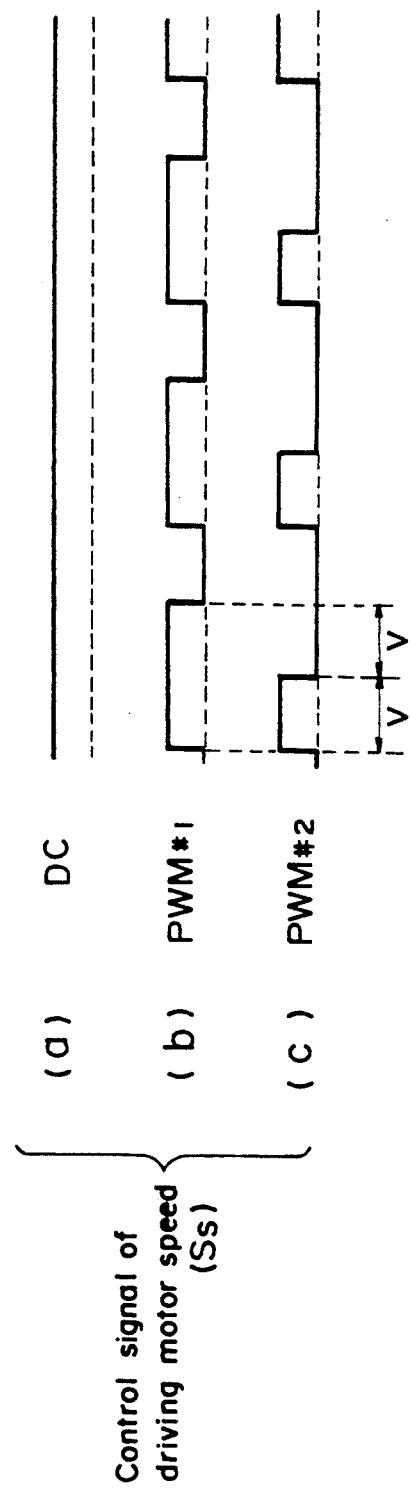
FIG. 7 is a view illustrates typical zoom lens driving motor speed control signals for use with the video camera.

In step F101 of FIG. 17 where the zoom lens is driven within the normal region, the driving speed control signal $S_S$ is supplied in the form of the normal DC signal. When the macro mode switch 18 is illustratively operated to initiate a macro auto focus operation, the zoom lens reaches point $P_2$. In step F102, a check is made to see if the zoom lens has entered the macro region. With the lens in the macro region, step F103 is reached in which the controller 10 stops generating the driving speed control signal $S_S$ in one vertical synchronizing period out of every three. That is, the intermittent signal of FIG. 7(b) is supplied to the zoom lens motor driver 11b. This makes it possible to fine-tune the zoom lens movement in the macro region. As described earlier, when the zoom lens has passed the just-focus point and is judged in step F104 to be in reverse mode (4), step F105 is reached. In step F105, the controller 10 generates the driving speed control signal $S_s$ for one vertical synchronizing period out of every three. This step is required to perform fine-tuned zoom lens movement up to the just-focus point $P_j$. That is, the intermittent signal of FIG. 7 (c) is supplied to the zoom lens motor driver 11b. This signal allows the zoom lens to be fine-tuned in its movement in fine-tuning mode (5) until the just-focus point is searched for and reached in step F106.

As described, the driving speed control signal $S_s$ is generated intermittently to drive the zoom lens. This makes it possible to establish the movement speed appropriate to the amount of movement while the signal voltage for providing a constant level of driving torque is maintained. Thus with the pulse width suitably set, the zoom lens is readily moved in a fine-tuned manner over a very short distance within the macro region (especially in fine-tuning mode (i.e., 5)).

In the example described above, the driving speed control signal $S_s$ is intermittently generated with a pulse width corresponding to appropriate vertical synchronizing periods. However, this arrangement is not limitative of the present invention. The pulse width for intermittent signal generation may be suitably set depending on the conditions unique to the implemented equipment. The pulse width, instead of being established in two stages for intermittent signal generation, may be controlled in a larger number of stages. Furthermore, the driving speed control signal $S_s$ may be generated intermittently only after reverse mode (4) is selected for mountain climbing control.

If necessary, the intermittent signal generating scheme may also be applied to zoom lens moving speed control in a normal mode. In some cases, this scheme may be applied to the focus lens.

As described, the video camera according to the invention has means to reverse the direction of the focus lens if appropriate evaluation data is not obtained within a certain period of time after an intermediate point is detected during focus lens movement in one direction. This feature eliminates the redundant operation of the focus lens moving away from the just-focus point all the way to the extreme of the current direction before heading back to the just-focus point during an auto focus operation. In this manner, an efficient auto focus operation is achieved.

Also as described, the video camera according to the invention has control means for not using a decrease in accumulated data as auto focus control information if that decrease is judged to be an abrupt drop from the accumulated data obtained in the immediately preceding focus lens position. This feature makes it possible to prevent the focus lens from being erroneously focused in such cases where some other object moves across between the video camera and its current object or where the video camera is abruptly panned from one object to another. In this manner, the photographing of high quality is always made available.

Also as described, the video camera according to the invention uses the same detection signal to detect both macro edge areas, and finds out in which of the two macro edge areas the zoom lens is located upon power-up or at the start of the macro mode. In this manner, the use of only a small number of switching devices is sufficient to detect zoom lens positions, and system error is prevented regarding the distinction between the two macro edge areas in any of which the zoom lens may be positioned.

Also as described, the video camera according to the invention has the controller that intermittently supplies a lens driving signal to the zoom lens driving circuit at least close to the just-focus point in the macro mode. This feature allows the zoom lens to be fine-tuned in its movement aimed at reaching the just-focus point. That is, the zoom lens is brought to the just-focus point more easily than ever before.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A video camera with a zoom lens capability comprising:
   a zoom lens having two zoom regions, one of said regions being a normal region ranging from a telephoto side to a wide angle side, the other region being a macro region, said macro region being delimited by two edge sub-regions thereof;
   zoom position detecting means for generating an edge signal when said zoom lens is in either of said edge sub-regions, said edge signal being the same for both said edge sub-regions;
   control means operatively connected to said zoom lens and said zoom position detecting means, for driving said zoom lens responsive in part to said edge signal; and
   macro-AF switch means for an operator to set the video camera in said normal mode or in a macro mode;
   a focus lens; and
   an auto focus means included in said control means for driving said focus lens to automatically focus the video camera in conjunction with a position of said zoom lens when said macro-AF switch means is set for said normal mode, and for driving said zoom lens to automatically focus the camera when set for said macro mode;
   wherein a first of said edge sub-regions is located adjacent said wide angle side and the second edge sub-region is located at the end of said macro region farthest from said normal region, this limit of said macro region being referred to as the macro side; and
   said control means drives said zoom lens to said macro side when said macro-AF switch means is set for a macro mode, to begin an auto focus operation in said macro mode at said macro side.

2. A video camera as in claim 1, wherein said control means moves said zoom lens toward said telephoto side if said edge signal is generated by said zoom position detecting means on power-up of the video camera.

3. A video camera as in claim 2, wherein:
   said zoom position detecting means generates a normal region signal when said zoom lens is in said normal region, said normal region signal being different from said edge signal; and
   said control means stops said driving of said zoom lens toward said telephoto side and sets the video camera in a normal mode for operation with said zoom lens in said normal range if said normal region signal is generated by said zoom position detecting means after it generates said edge signal at said power-up of the video camera.

4. A video camera as in claim 2, wherein:
   said zoom position detecting means generates a macro region signal when said zoom lens is in said macro region between said edge sub-regions, said macro region signal being different from said edge signal; and
   said control means drives said zoom lens back to its initial position at said power-up of the video camera and sets said video camera in a macro mode if said macro region signal is generated by said zoom position means after it generates said edge signal at said power-up of the video camera, said initial position being the one of said two sub-regions which is located the farthest from said wide angle side of said normal region.

5. A video camera as in claim 1, wherein, during said driving of said zoom lens from said normal region to said macro side following the setting of said macro-AF switch to said macro mode, said control means;
   recognizes whether each said generating of said edge signal by said zoom position detecting means is a first occurrence thereof;
   when it is such a first occurrence, is disabled from recognizing said edge signal for a predetermined period during which said zoom lens passes through said first edge region; and
   recognizes a second occurrence of said edge signal when said zoom lens enters said second edge region and stops said zoom lens at said macro side to allow said start of said auto focus operation in said macro mode.

6. A video camera as claimed in claim 1, said control means further comprising:
   macro-AF switch means for selecting between a normal mode in which the video camera is focused while said zoom lens is in said normal region and a macro mode in which said zoom lens is moved in said macro region to focus the video camera; and
   power zoom control means for switching on motion of said zoom lens, while the video camera is in said normal mode, in a selected direction towards said telephoto side or towards said wide angle side;
   wherein, in the case that said selected direction is towards said macro side, when said edge signal is generated said control means moves said zoom lens toward said telephoto side and stops it a predetermined distance from said macro side.

7. A video camera as claimed in claim 2, said control means further comprising:
   macro-AF switch means for selecting between a normal mode in which the video camera is focused while said zoom lens is in said normal region and a macro mode in which said zoom lens is moved in said macro region to focus the video camera; and
   power zoom control means for switching on motion of said zoom lens, while the video camera is in said normal mode, in a selected direction towards said telephoto side or towards said wide angle side;
   wherein, in the case that said selected direction is towards said macro side, when said edge signal is generated said control means moves said zoom lens toward said telephoto side and stops it a predetermined distance from said macro side.

8. A video camera as claimed in claim 3, said control means further comprising:
   macro-AF switch means for selecting between said normal mode in which the video camera is focused while said zoom lens is in said normal region and a macro mode in which said zoom lens is moved in said macro region to focus the video camera; and
   power zoom control means for switching on motion of said zoom lens, while the video camera is in said normal mode, in a selected direction towards said telephoto side or towards said wide angle side;

wherein, in the case that said selected direction is towards said macro side, when said edge signal is generated said control means moves said zoom lens toward said telephoto side and stops it a predetermined distance from said macro side.

9. A video camera with an auto focus capability comprising:

a lens having at least one region of movement for its operation; and an auto focus means for driving said lens for focus adjustment of the video camera in said region, said auto focus means including i) signal means for providing a forward drive signal, a reverse drive signal, and a drive speed signal, and ii) drive means for driving said lens responsive to said signals;

wherein said drive speed signal comprises a pulsed signal at least during a final portion of an auto focus operation in the vicinity of the position of said lens for focus of the video camera, so that said drive means intermittently moves said lens at least during said final portion of the auto focus operation;

said lens being a focus lens; and further comprising a further lens, said further lens being a zoom lens;

wherein said region is a normal region between telephoto and wide angle sides thereof;

said focus and zoom lens are moved over said normal region in a normal mode for auto focus and zoom operation between said telephoto and wide angle sides, and beyond said wide angle side into a macro region for operation in a macro mode; and said auto focus means focuses the video camera in said macro mode by driving said zoom lens in the same manner as said driving of said focus lens in said normal region in said normal mode, that is, with forward and reverse drive direction signals and a pulsed drive speed signal for intermittently moving said zoom lens in at least a final portion of the positioning of said zoom lens for said auto focusing operation in said macro region.

10. A video camera with an auto focus capability comprising:

a lens having at least one region of movement for its operation; and an auto focus means for driving said lens for focus adjustment of the video camera in said region, said auto focus means including i) signal means for providing a forward drive signal, a reverse drive signal, and a drive speed signal, and ii) drive means for driving said lens responsive to said signals;

wherein said drive speed signal comprises a pulsed signal at least during a final portion of an auto focus operation in the vicinity of the position of said lens for focus of the video camera, so that said drive means intermittently moves said lens at least during said final portion of the auto focus operation;

wherein said lens is a zoom lens;

said region is a macro region adjacent a wide angle side of a normal region which extends from said wide angle side to a telephoto side thereof; and said drive means intermittently moves said zoom lens in said macro region for said focusing of the video camera.

11. A video camera as claimed in claim 10, wherein said focusing operation in said macro region comprises:

a first part in which said zoom lens is moved at a fixed speed but intermittently with a first duty cycle until the focus point is passed; and a second part in which said zoom lens is moved in the opposite direction back to said focus point at said fixed speed but intermittently with a second duty cycle that is lower that said first duty cycle;

whereby the effective speed of said zoom lens is faster in said first part than in said second part.

12. A video camera with an auto focus function comprising:

a lens which is moveable over a range for focusing the video camera;

control means for generating an auto focus signal and for controlling the position of said lens over said range according to said auto focus signal;

detecting means for detecting the position of said lens at the edges of said range and at a reference position substantially at the center of said range; and signal means for generating a signal which increases with the extent of focusing provided by said lens at its position in said range, and which has a low value which substantially does not change if the video camera is sufficiently out of focus for the current position of said lens;

wherein said control means moves said lens from its starting position at the beginning of an auto focus operation toward said reference position, and reverses the direction of movement of said lens if said signal does not increase within a predetermined distance or time after passing said reference position, said lens being moved accordingly in the other direction; wherein said lens is a focus lens for focusing the video camera in said normal region; and the video camera comprises a further lens which is a zoom lens, said zoom lens being moveable in said normal range for setting the magnification of the image provided by the video camera while said auto focusing of said focus lens occurs, and moveable in a macro range adjacent said normal range for focusing said video camera;

wherein means are provided so that the position of said zoom lens in said macro range is controlled in the same manner as said focus lens in said range, and said zoom lens is manually operated in said normal region.

13. A video camera as claimed in claim 12, further comprising:

said lens being a zoom lens;

said zoom lens having two regions for its operation, one of said regions being a normal region ranging from a telephoto side to a wide angle side, the other region being a macro region, said macro region being delimited by two edge sub-regions thereof, said macro region being said range;

zoom position detecting means for generating an edge signal when said zoom lens is in either of said edge sub-regions, said edge signal being the same for both said edge sub-regions; and control means operatively connected to said zoom lens and said zoom position detecting means, for driving said zoom lens responsive in part to said edge signal.

14. A video camera with an auto focus function comprising:

a lens which is moveable over a range for focusing the video camera;

control means for generating an auto focus signal and for controlling the position of said lens over said range according to said auto focus signal;

detecting means for detecting the position of said lens at the edges of said range and at a reference position substantially at the center of said range; and signal means for generating a signal which increases with the extent of focusing provided by said lens at its position in said range, and which has a low value which substantially does not change if the video camera is sufficiently out of focus for the current position of said lens;

wherein said control means moves said lens from its starting position at the beginning of an auto focus operation toward said reference position, and reverses the direction of movement of said lens if said signal does not increase within a predetermined distance or time after passing said reference position, said lens being moved accordingly in the other direction; wherein said region is a macro region;

said lens is a zoom lens for focusing the video camera in a macro mode corresponding to said zoom lens being in said macro region, and is moveable as well over a normal range adjacent said macro range for changing the magnification of the image of the video camera, the camera being in a normal mode when said zoom lens is in said normal range; and the video camera comprises a further lens which is a focus lens, said focus lens being moveable in a range for focusing said video camera in said normal mode;

wherein means are provided for controlling the position of said focus lens in said normal range in the same manner as said zoom lens in said macro region, and to allow said zoom lens to be selectively motor driven by an operator in said normal region while said focus lens is auto focussed.

15. A video camera with an auto focus capability comprising:

a lens having at least one region of movement for its operation; and an auto focus means for driving said lens for focus adjustment of the video camera in said region, said auto focus means including i) signal means for providing a forward drive signal, a reverse drive signal, and a drive speed signal, and ii) drive means for driving said lens responsive to said signals;

wherein said drive speed signal comprises a pulsed signal at least during a final portion of an auto focus operation in the vicinity of the position of said lens for focus of the video camera, so that said drive means intermittently moves said lens at least during said final portion of the auto focus operation;

said lens being a zoom lens having two of said regions of movement for its operation, a first of said two regions being a normal region ranging from a telephoto side to a side angle side, the other region being a macro region, said macro region being delimited by two edge sub-regions thereof;

zoom position detecting means for generating an edge signal when said zoom lens is in either of said edge sub-regions, said edge signal being the same for both said edge sub-regions; and control means operatively connected to said zoom lens and said zoom position detecting means, for driving said zoom lens responsive in part to said edge signal.

* * * * *